US008489999B2

(12) United States Patent
Harvey et al.

(10) Patent No.: US 8,489,999 B2
(45) Date of Patent: Jul. 16, 2013

(54) SHARED USER INTERFACE SURFACE SYSTEM

(75) Inventors: Brandon L. Harvey, Chicago, IL (US); Kelly L. Dempski, Evanston, IL (US)

(73) Assignee: Accenture Global Services Limited, Dublin (IE)

( * ) Notice: Subject to any disclaimer, the term of this patent is extended or adjusted under 35 U.S.C. 154(b) by 1137 days.

(21) Appl. No.: 12/203,111

(22) Filed: Sep. 2, 2008

(65) Prior Publication Data

US 2010/0058201 A1    Mar. 4, 2010

(51) Int. Cl.
*G06F 3/00* (2006.01)

(52) U.S. Cl.
USPC ............................ 715/751; 715/748; 715/761

(58) Field of Classification Search
USPC ........................................ 715/751, 748, 761
See application file for complete search history.

(56) References Cited

U.S. PATENT DOCUMENTS

| 5,491,743 | A | 2/1996 | Shiio et al. |
| 7,007,236 | B2 | 2/2006 | Dempski et al. |
| 7,949,948 | B2 * | 5/2011 | Schorr ........................ 715/243 |
| 8,166,080 | B2 * | 4/2012 | Elaasar et al. ................ 707/805 |
| 8,392,419 | B2 * | 3/2013 | Heaton et al. ................. 707/737 |
| 2003/0225832 | A1 | 12/2003 | Ludwig |
| 2006/0161585 | A1 * | 7/2006 | Clarke et al. ............... 707/104.1 |
| 2010/0128031 | A1 * | 5/2010 | Uoi et al. ...................... 345/419 |

FOREIGN PATENT DOCUMENTS

| EP | 1681629 A1 | 7/2006 |
| EP | 1681652 A3 | 7/2007 |
| WO | WO9964959 A1 | 12/1999 |

OTHER PUBLICATIONS

Lee Jang Ho et al: "Supporting multi-user, multi-applet workspaces in CBE", ACM Conference on Computer Supported Cooperative Work Nov. 16, 1996, pp. 344-353, XP002558183 DOI: 10.1145/240080.240326 ISBN: 0-89791-765-0 Retrieved from the Internet: URL:http://portal.acm.org/citation.cfm?doid=240080.240326 [retrieved on Nov. 30, 2009].

Mohamed Bourimi et al: "Leveraging Visual Tailoring and Synchronous Awareness in Web-Based Collaborative Systems" Jul. 16, 2007, Groupware: Design, Implementation, and use; [Lecture Notes in Computer Science], Springer Berlin Heidelberg, Berlin, Heidelberg, pp. 40-55, XP019099732 ISBN: 9783540748113.

Geyer W; Richter H; Fuchs L; Frauenhofer T; Daijavad S; Poltrock S: "A team collaboration space supporting capture and access of virtual meetings" Proceeding of the International ACM SIGGROUP Conference on Supporting Group Work 2001 pp. 188-196, XP002558185 DOI: http://doi.acm.org/10.1145/500286.500315 ISE 1-58113-294-8 Retrieved from the Internet: URL:http://portal.acm.org/citation.cfm?id=500286.500315 [retrieved on Nov. 30, 2009].

(Continued)

*Primary Examiner* — David Phantana Angkool
(74) *Attorney, Agent, or Firm* — Fish & Richardson P.C.

(57) ABSTRACT

The shared user interface surface system is a simple and lightweight collaboration tool that is accessible simultaneously by multiple users through multiple sources. The shared user interface surface system provides a way to share a user interface surface and corresponding shared surface object, and coordinates local manipulations of respective local representations of the shared user interface surface and corresponding shared surface object, and updates the respective local representations with a group representation. The system accommodates diverse collaboration requirements including mixed written and spoken languages, utilization of the accessibility layer for physically disabled and disparate computing resources.

31 Claims, 16 Drawing Sheets

OTHER PUBLICATIONS

P. Dewan, R. Choudhary: "A High-Level and Flexible Framework for Implementing Multiuser User Interfaces" ACM Transactions on Information Systems, vol. 10, No. 4, Oct. 1992, pp. 345-380, XP040070334 Penn Plaza, Suite 701—New York USA.

Spellman Peter J; Mosier Jane N; Deus Lucy M; Carlson Jay A: "Collaborative virtu workspace" Proceedings of the International ACM SIGGROUP Conference on Supporting Group Work 1997, pp. 197-203, XP002558186 001: http://doi.acm.org/10.1145/266838.266902 ISBN: 0-89791-897-5 Retrieved from the Internet: URL:http://portal.acm.org/citation.cfm?id=266838.266902&coll=GUIDE&d1=GUIDE&CFID=65733281&CFTOKEN=445252 [retrieved on Nov. 30, 2009].

R. Roseman, S. Greenberg: "Team Rooms: network places for collaboration" Proceedings of the 1996 ACM conference on Computer supported cooperative wor 1996, pp. 325-333, XP002558187 DOI: http://doi.acm.org/URL:http://portal.acm.org/citation.cfm?id=240319 [retrieved on Nov. 30, 2009].

European Patent Office Examination Report for Application No. 09252106.1 mailed Feb. 15, 2011 (8 pages).

C. Froeschl, B. Sprengseis: "ConceptShare" Telekooperation: Kooperation (VL) Abschlussbericht, FH-Oberosterreich, Campus Hagenberg Jan. 6, 2007, pp. 1-31, XP002558184 Retrieved from the Internet: URL:www.christina-froeschl.at/downloads/conceptshare.pdf [retrieved on Nov. 30, 2009].

Canadian Examiners Report for Application No. 2,677,435 dated Mar. 13, 2012 (10 pages).

China First Office Action (with English translation) for Application No. 200910171060.9 dated Feb. 22, 2012, 10 pages.

* cited by examiner

SHARED USER INTERFACE SURFACE SYSTEM

BACKGROUND OF THE INVENTION

1. Technical Field

This disclosure concerns a collaboration tool that is accessible simultaneously by multiple users through multiple sources. In particular, this disclosure concerns a system, product and method for sharing a user interface surface and corresponding shared surface object that coordinates local manipulations of respective local representations of the user interface surface and corresponding shared surface object, and updates the respective local representations with a group representation.

2. Related Art

Organizations are continually challenged to identify efficient and cost effective collaboration tools. Today, members of globally distributed organizations increasingly collaborate with other members from different regions of the world. Unfortunately, rising fuel costs and the time required to travel in order to collocate individuals create barriers to improving the economic positions of many organizations. Unfortunately, organizations without collaboration tools that are simple, lightweight and provide a high performance way to share a user interface surface among multiple users may, as a result, also fail to realize the productivity gains necessary to be competitive.

The fast pace of many industries require organizations to rapidly assemble teams from various areas of expertise that can quickly identify problems and develop solutions. Organizations with globally distributed workforces who work under compressed development schedules in highly specialized and complex knowledge areas need a tool that reduces barriers to collaboration. Regardless of the geographical distribution of an organization, members of organizations may have diverse collaboration requirements (e.g., varying languages, physical disabilities and computing resources) that many collaboration tools may not even accommodate.

Currently available collaboration tools are generally restricted in one of three ways: 1) a physical location defines where a collaboration may take place (e.g., Thunder® and TeamSpot®); 2) a session defines the availability and existence of shared content so that once the session ends the shared content becomes unavailable (e.g., WebEx and Adobe Connect®); and 3) a user owns a document, the user grants and revokes rights to the document, and the document is stored on the owner's resources where documents are shared over a network (e.g., Microsoft OneNote®).

Collaboration tools that are highly customized and expensive to implement may impose user-side computing requirements (e.g., resource intensive client-side systems) and require significant user training. For example, Sharepoint® documents are serially checked-out and edited from a common repository. Some group-collaboration tools adhere to strictly linear text formats (e.g., SubEthaEdit® and Google Docs®). Collaborative tools such as skrbl.com®, thinkature.com®, conceptShare® and Adobe JamJar® are based on small text snippets, but limit the type of content available for sharing. Collaboration tools often may use elaborate schemes in order to maintain versioning information for each collaborator and require significant system administration support in order to properly maintain. Such collaboration tools may also limit the type of information and data with which users can collaborate.

SUMMARY

The shared user interface surface system (hereinafter "system") provides a cost effective and lightweight collaboration tool that multiple users can simultaneously access through multiple sources. The system provides a persistent shared user interface surface that is synchronized in real-time with all users accessing the shared user interface surface. A shared user interface surface (e.g., canvas) may include various types of content (e.g., text items, sketches and images). A shared user interface surface may be used as a scratch pad for a single user and/or as a shared space for multiple users, because shared user interface surfaces are stored on a web server rather than being stored on the hard drive of a particular user. Accordingly, shared user interface surface can be viewed, edited and shared by multiple users from various locations, simultaneously.

In one implementation, the system provides a way to share a user interface surface that is accessible simultaneously by multiple users through multiple respective sources. The system may comprise a processor and memory coupled to the processor. The memory may comprise shared surface logic that generates local canvases that are responsive to user interactions. The local canvases include a first local canvas and a second local canvas, and each local canvas comprises local canvas boundaries and a local canvas identifier. The shared surface logic may also generate a first group canvas that corresponds to at least two of the local canvases. The local canvases corresponding to the first group canvas establish a first set of local canvases that are respective local representations of the first group canvas. The first group canvas is a shared surface representation of the first set of local canvases. The memory may further comprise interaction detection logic that detects multiple user interactions corresponding to the local canvases. One of the detected multiple user interactions may correspond to the first set of local canvases. The interaction detection logic may update the first group canvas to obtain an updated first group canvas, and update the first set of local canvases based on the updated first group canvas.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

DETAILED DESCRIPTION OF THE PREFERRED EMBODIMENTS

Figure 1:
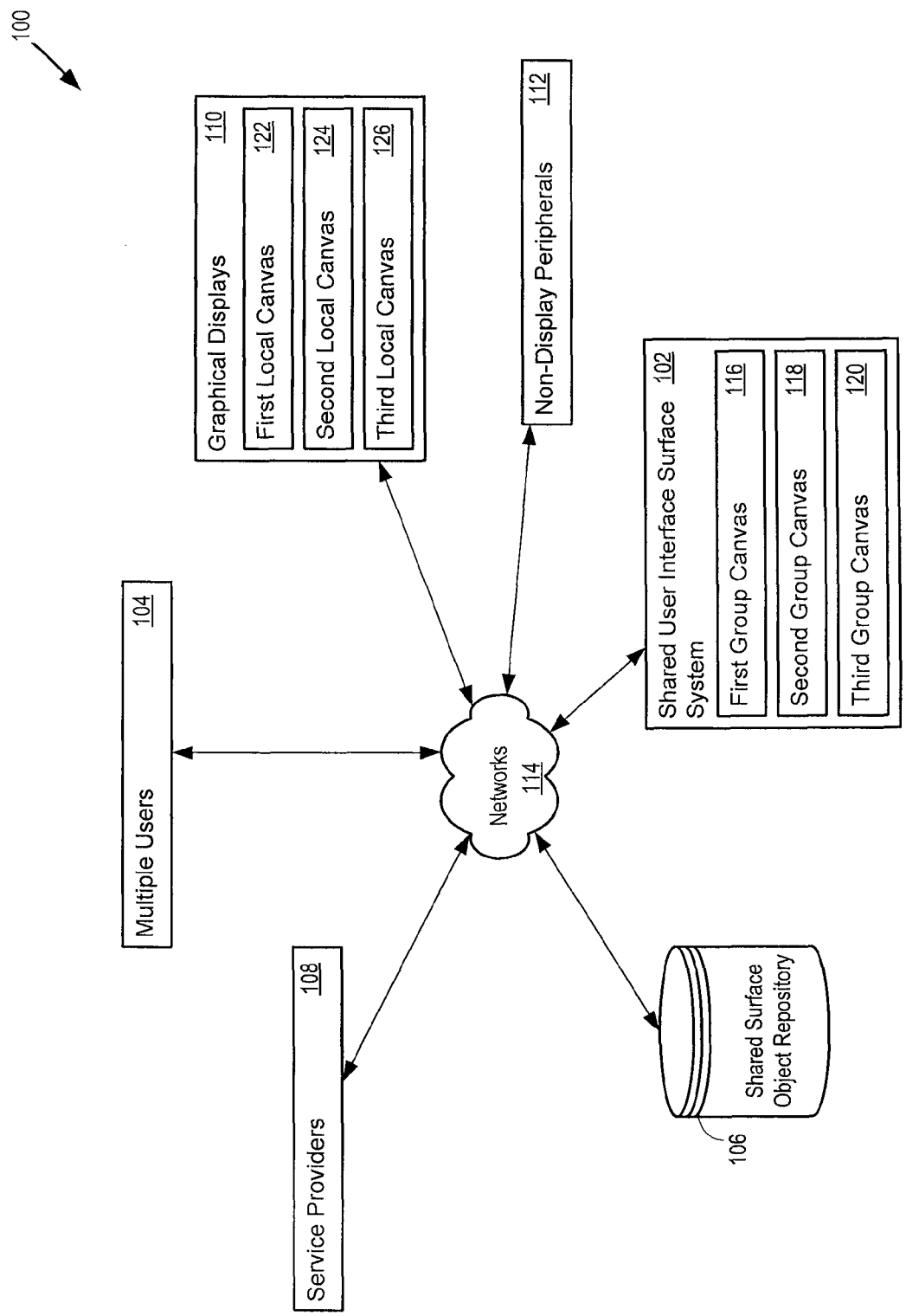
FIG. 1 illustrates a shared user interface surface system architecture.

The system provides a simple, lightweight, and high performance way to share a user interface surface among multiple users through multiple sources. In one implementation, the system employs client-server architecture that includes Ruby on Rails® on the server-side and Microsoft .Net libraries to deploy client-side applications running on Windows platforms, including Windows XP and Vista. The system may employ alternative technologies such as ASP.NET and server-side Java to create web services, and/or server-side frameworks such as Django® and Lift®. In one implementation, the client-side applications (e.g., web page showing a RSS feed running on a mobile device) may be written using Java, C++, and/or any other client-side technology. In one implementation, the system resembles a drawing program and/or a digital whiteboard that produces a semi-structured document (e.g., canvas) similar in appearance to a Microsoft OneNote page. The system may employ the representation state transfer (REST) software application architecture that is modeled after the way data is represented, accessed and modified on the web. The system considers data and functionality to be resources that are accessible using Uniform Resource Identifiers (URIs) (e.g., links on the Internet). The system employs RESTful web services that use a standardized interface (e.g., XML files) and stateless communication protocol (e.g., HTTP) to exchange representations of resources between clients and servers.

Local canvases and local canvas shared surface object representations may correspond to client-side resources, while group canvases and group canvas shared surface object representations correspond to server-side resources. A local canvas may display the local canvas state of a shared surface object, communicate local canvas user interactions to the system, poll the system for the group canvas state of the shared surface object, and fetch and update the local canvas with the group canvas state of the shared surface object. A local canvas may be used as a standalone executable program and/or as a Rich Internet Application. A local canvas may be maintained continuously, minimized and left running in the background. Drawing and sketching capabilities using a local canvas may be supported by the addition of a stylus on a Tablet PC and/or with outboard tablet hardware.

In one implementation, the system comprises web applications that expose resources (e.g., data and functionality) through web URIs and use HTTP methods (e.g., GET, POST, PUT and DELETE) to create, retrieve, update and delete resources. The function calls may be in the form of http://servername/admin/functionname. In one implementation, the method calls used by the system include credentials in the HTTP header that are authenticated against an extended security option (ESO) web service.

The HTTP GET method may use the local canvas identifier to request a resource. HTTP GET with specially formatted URL may return a list of shared surface objects in the local canvas identified by the local canvas identifier and information about the shared surface object, including: the shared surface object identifier and the group canvas shared surface object version. The HTTP POST method call may create a resource, including images, drawings, and other binary-based content. The HTTP POST method call may include a field encoded into a text format compatible with URL encoding and storage in a database (e.g., MySql database and/or other databases compatible with Ruby on Rails®). The HTTP PUT method call modifies a resource identified by a local canvas identifier.

A local canvas may compare the local canvas shared surface object version to the group canvas shared surface object version to determine whether to update the local canvas shared surface object representation with the group canvas shared surface object representation. In one implementation, in the event a local canvas communicates a non-universally unique local canvas identifier, shared surface object identifier, group canvas shared surface object version and/or local canvas shared surface object version to the system, the system returns an 'unknown/undefined' value as a consequence.

Multiple simultaneous local canvas user interactions may occur corresponding to different local canvases, referred to as the collision scenario. In one implementation, the system determines whether an update of a local canvas shared surface object representation is "stale". The system may consider an attempt to update a local canvas shared surface object representation that does not correspond to the group canvas shared surface object version to be stale. In other words, a local canvas shared surface object version that is earlier than a corresponding group canvas shared surface object version is considered stale.

For example, a first user and a second user, through different local canvases corresponding to a common group canvas, simultaneously perform local canvas user interactions, a first local canvas user interaction and a second local canvas user interaction, respectively. The system determines the first local canvas user interaction to be received first and accepted, the group canvas shared surface object version is updated, the group canvas shared surface object representation is updated with the first local canvas shared surface object representation. The system determines the second canvas user interaction to be received second and declared stale. The second local canvas user interaction may be discarded. In one implementation, the second local canvas user interaction is stored for use by the second user. The second local canvas may discover the collision by polling the system for the state of the local canvas shared surface object representation and determine that the local canvas shared surface object representation is stale. For example, the second local canvas may compare the local canvas shared surface object version and group canvas shared surface object version, and determine that the group canvas shared surface object version is more recent. The second local canvas may fetch the group canvas shared surface object representation to update the local canvas shared surface object representation and local canvas shared surface object version.

When a shared surface object is added to a local canvas (e.g., a user adds a file and/or other content to the local canvas)

the local canvas shared surface object representation of the local canvas shared surface object may be displayed directly in the local canvas (e.g., text or images). A service provider responsive to the local canvas shared surface object may be employed to present the local canvas shared surface object representation of the local canvas shared surface object in the local canvas. For example, the shared surface object may be an audio clip and when the shared surface object is added to the local canvas an audio player and/or editor (e.g., service provider) is enlisted to present the local canvas shared surface object representation in the local canvas.

In the event the local canvas cannot display the local canvas shared surface object representation (e.g., a service provide is unavailable to the local canvas to present the local canvas shared surface object representation), the local canvas shared surface object may be represented in the local canvas as a stub (e.g., a hyperlink reference to the local canvas shared surface object. A local canvas shared surface object corresponding to a stub may be stored in a shared documents folder of the local canvas user (e.g., SharePoint site) and the stub points to location of the local canvas shared surface object in the shared documents folder. When group canvas users select the stub in the respective local canvases, the local canvas shared surface object loads directly from the shared documents folder.

FIG. 1 illustrates a shared user interface surface system architecture (hereinafter "architecture") 100. The architecture 100 includes the shared user interface surface system (hereinafter the "system") 102, multiple users 104, a shared surface object repository 106, service providers 108, graphical displays 110, and non-display peripherals 112. The components of the system architecture 100 may communicate with each other through networks 114 (e.g., the Internet).

The system 102 may generate group canvases (e.g., a first group canvas 116, a second group canvas 118 and third group canvas 120). A group canvas (e.g., 116, 118 and 120) represents a shared representation of a shared surface corresponding to a local representation of the shared surface represented by a local canvas (e.g., first local canvas 122, a second local canvas 124 and a third local canvas 126). In other words, the multiple users 104 access local representations of a shared surface through local canvases, while a group representation represents a synchronized version of the shared surface and corresponds to a group canvas. From time to time local canvases may include user interactions from the multiple users 104 that have not been synchronized, and differences between local canvases and corresponding group canvas reflect such user interactions.

The non-display peripherals 112 may include various non-visual communication devices, including: speakers; microphones; touch pads; and malleable surfaces (e.g., used for brail or to replicate terrain). The non-display peripherals 112 may utilize the Microsoft accessibility layer functionality and augment and/or substitute for the capabilities provided by the graphical displays 110. In one implementation, the system 102 employs the service providers 108 and non-display peripherals 112 to provide non-visual representations of local canvases and local canvas shared surface object representations, and allow users to non-visually manipulate the local canvases and local canvas shared surface object representations. For example, a user may communicate audio commands through a microphone (non-display peripheral 112) to manipulate a local canvas and/or local canvas shared surface object representation.

Figure 11:
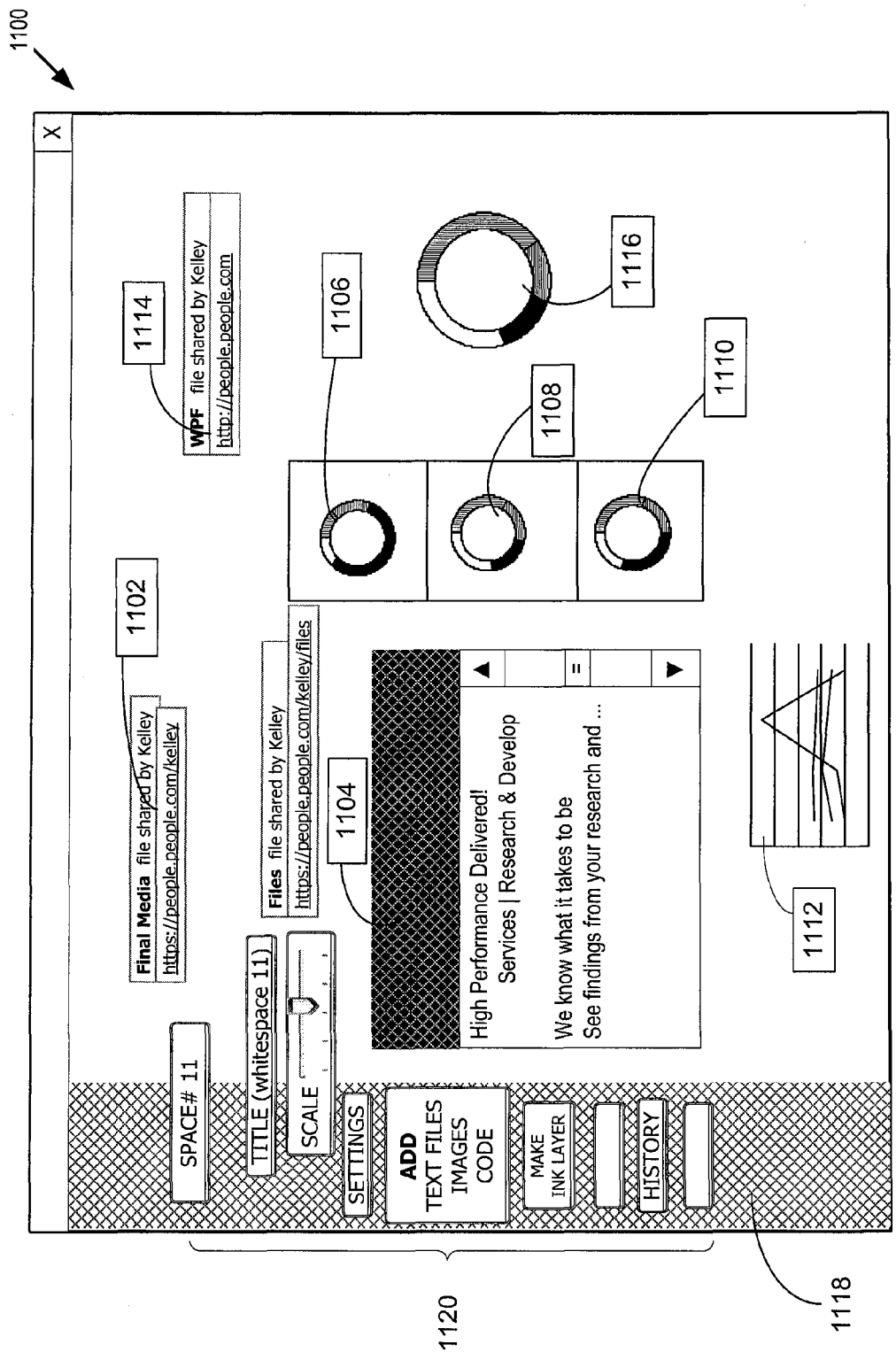
FIG. 11 illustrates a local canvas comprising multiple local canvas shared surface object representations.

FIG. 11 illustrates a local canvas comprising multiple local canvas shared surface object representations 1100. Local canvas shared surface object representations (e.g., 1102, 1104, 1106, 1108, 1110, 1112, 1114 and 1116) may vary in size and content, and comprise any number of unique characteristics. A local canvas may comprise a local canvas side-bar 1118 that includes local canvas tools 1120. Inactive local canvas shared surface object representations and icons and/or avatars of group canvas users (e.g., a buddy list) may be positioned in the local canvas side-bar 1118. A user may create in a first local canvas a short-cut to a second local canvas so that the user can quickly move between canvases.

In one implementation, the system 102 generates a number of persistent group canvases (e.g., 100,000 group canvases) the number of which an administrator may pre-configure and periodically generate as needed. A user may browse the group canvases and select a particular group canvas to use. A user may use the local canvas tools 1120 to invoke a 'get next available canvas' selection that locates an unused group canvas.

Figure 2:
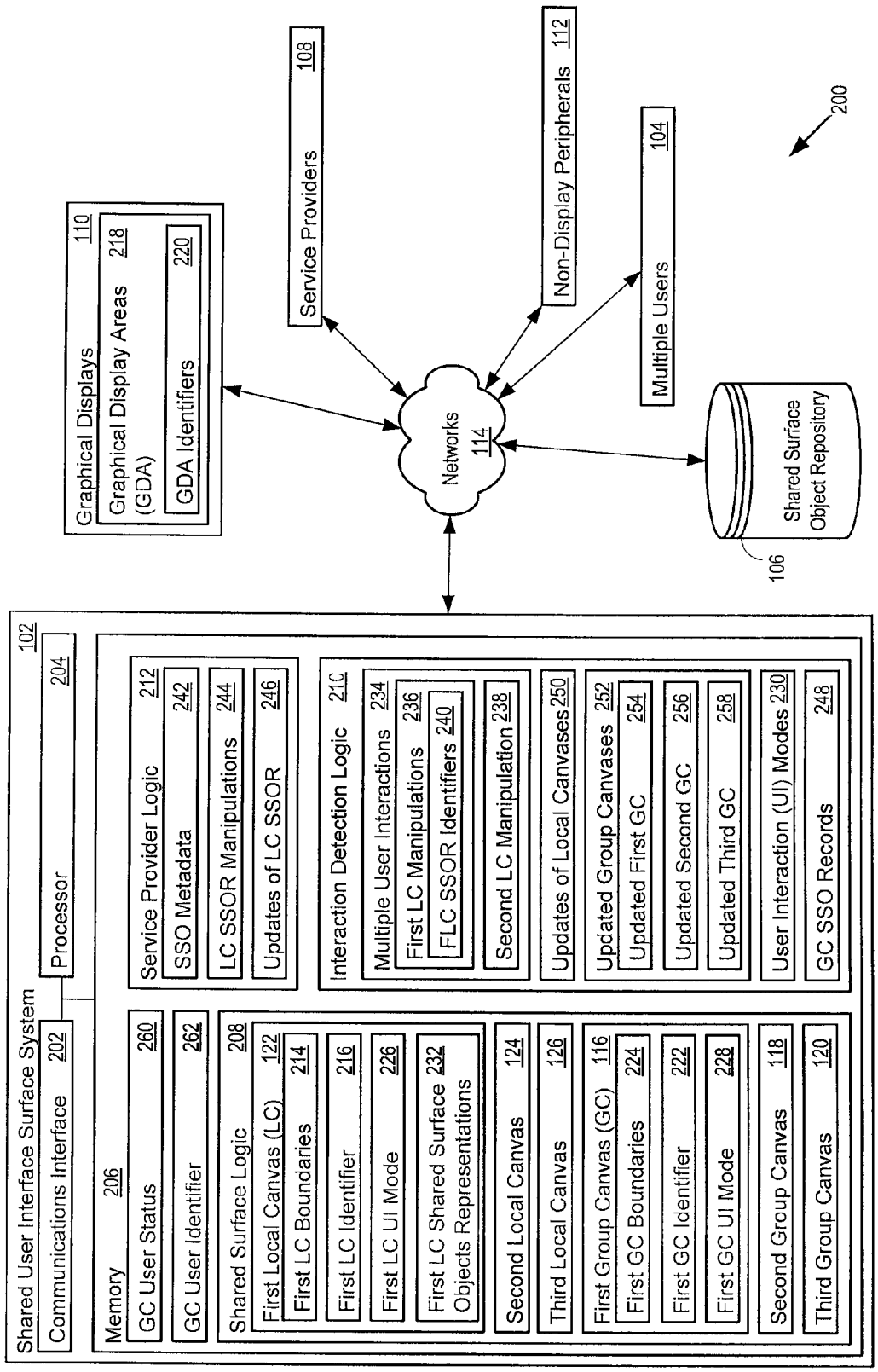
FIG. 2 shows a user interface surface system.

FIG. 2 illustrates a detailed embodiment 200 of the shared user interface surface system 102. The system 102 includes a communications interface 202 that the system 102 uses to communicate with the various components through the networks 114, a processor 204 and a memory 206. The memory 206 may includes shared surface logic 208, interaction detection logic 210 and service provider logic 212. In one implementation, the shared surface logic 208, interaction detection logic 210 and service provider logic 212 correspond to web services that exchange representations of shared surface object representations between local canvases and group canvases.

The shared surface logic 208 may generate local canvases (e.g., 122, 124 and 126) responsive to user interactions from the multiple users 104. A local canvas comprises local canvas boundaries (e.g., first LC boundaries 214) that define the dimensions of the local canvas and a local canvas identifier (e.g., first LC identifier 216) that uniquely identifies the local canvas. A local canvas identifier 216 corresponds to a graphical display area 218 identified by a graphical display identifier 220.

The shared surface logic 208 may generate group canvases (e.g., 116, 118 and 120). A group canvas (e.g., 116, 118 and 120) represents a shared representation of a shared surface. A group canvas (e.g., 116, 118 and 120) includes a group canvas identifier (e.g., first GC identifier 222), and group canvas boundaries (e.g., first GC boundaries 224) that define the dimensions of the group canvas. A local canvas may correspond to more than one group canvas. For example, the shared surface logic 208 may generate the first group canvas 116 and the second group canvas 118 corresponding to a first and a second set of local canvases, respectively, from the local canvases (e.g., 122, 124 and 126) so that the first set of local canvases include 122 and 124 and correspond to the first group canvas 116, while the second set of local canvases include 122 and 126 and correspond to the second group canvas. In the aforementioned example, the first local canvas 122 corresponds to two group canvases (e.g., 116 and 118).

A first local canvas 122 and a second local canvas 124 that comprise first local canvas boundaries and second local canvas boundaries (e.g. 214), respectively, where at least a portion of the first local canvas boundaries and second local canvas boundaries are common to both the first local canvas and the second local canvas may define a group canvas (e.g., 116) comprising group canvas boundaries (e.g., 224) corresponding to the portion of the first local canvas boundaries and the second local canvas boundaries that are common to both local canvases.

A first local canvas 122 and second local canvas 124 that comprise first local canvas boundaries and second local canvas boundaries where the first local canvas boundaries are within the second local canvas boundaries may define a group canvas comprising group canvas boundaries corresponding to the first local canvas boundaries. A local canvas may comprise local canvas boundaries where at least two different portions of the local canvas boundaries correspond to two different group canvases.

A first group canvas 116 and second group canvas 118 may comprise first group canvas boundaries and second group canvas boundaries where the first group canvas boundaries and the second group canvas boundaries define a third group canvas 120 where the first group canvas boundaries and the second group canvas boundaries are within the third group canvas boundaries.

The local canvases (e.g., 122, 124 and 126) and group canvases may each include a user interaction (UI) mode specifier (e.g., first LC UI mode 226 and first GC UI mode 228, respectively) that specifies the types of interactions to which the corresponding local and group canvases may be responsive. The local canvas UI mode (e.g., first LC UI mode 226) may be user configurable (discussed further below). The group canvas UI mode (e.g., first GC UI mode 228) may be configurable by an administrator, the 102 system, and/or at least one of the multiple users 104 designated with the authorization to set the group canvas UI mode (discussed further below).

The system 102 includes a group canvas user status 260 and group canvas user identifier 262 for each group canvas to which each of the multiple users 104 correspond. The group canvas user status 260 indicates the state of a user of a local canvas corresponding to a group canvas. For example, the group canvas user status 260 indicates whether a user is currently interacting with a corresponding local canvas, whether the user is available to interact with the local canvas, and whether the user has recently interacted with the local canvas. The group canvas user identifier 262 uniquely identifies a local canvas user corresponding to a group canvas.

The interaction detection logic 210 may detect the user interaction modes 230 (e.g., 226 and 228), the group canvas user status 260 and the group canvas user identifier 262 to determine the level of collaboration and interaction available between the multiple users 104. The system 102 may use the group canvas user status 260 and the group canvas user identifier 262 to present an icon and/or avatar corresponding to a user for each of the respective group canvases to which a user corresponds.

Local canvases (e.g., 122, 124 and 126) may include a local canvas shared surface object representation (e.g., first LC shared surface objects representations 232). Group canvases (e.g., 116, 118 and 120) may include group canvas shared surface object representation to which respective local canvas shared surface object representations correspond. The system 102 may synchronize a local representation with a corresponding group canvas shared surface object representation based on the user interaction modes 230 (e.g., 226 and 228), the group canvas user status 260 and the group canvas user identifier 262.

The multiple user interactions 234 may represent respective local manipulations (e.g., first LC manipulations 236 and second LC manipulations 238) of a local canvas shared surface object representation 232, wherein at least a portion of the local canvas shared surface object representation 232 is within the local canvas boundaries of a corresponding local canvas. The interaction detection logic 210 may detect the local canvas shared surface object representation 232 using a shared surface object identifier 240. The interaction detection logic 210 may detect the multiple user interactions 234 corresponding to the local canvases (e.g., 122, 124 and 126), detect whether at least two of the multiple user interactions 234 correspond to one of the local canvases and whether the multiple user interactions 234 correspond to at least two different users of the multiple users 104. For example, where at least two of the multiple users 104 simultaneously interact with the first local canvas 122, the interaction detection logic 210 can detect whether the simultaneous interactions with the first local canvas 122 represent interactions from separate users.

The service provider logic 212 may analyze shared surface object metadata 242 corresponding to the local canvas shared surface object representation 232. The service provider logic 212 may communicate the shared surface object metadata 242 and the local manipulations of the local canvas shared surface object representations 244 to service providers 108 responsive to the local canvas shared surface object representation 232 and shared surface object metadata 242. The service providers 108 generate updates of the local canvas shared surface object representation 246 for each of the local canvases corresponding to the respective local manipulations of the local canvas shared surface object representations 244. The updates of the local canvas shared surface object representation 246 may be different for each local canvas (e.g., 122, 124 and 126) until the local canvases are synchronized with an updated group canvas shared surface object representation. For example, a service provider 108 that provides a videoconferencing service may fetch the contents of a videoconference window from a web server and rendered the content in a local canvas using a web browser component. The system 102 may orchestrate the collaboration of services provided by service providers 108. In one implementation, the system 102 is representation neutral so that a local canvas can be presented in any number for formats. For example, a local canvas may be represented in a list format such as provided by a RSS feed.

The interaction detection logic 210 may generate a group canvas shared surface object record 248, based on the shared surface object metadata 242 and the updates of the local canvas shared surface object representation 246 received from the service provides 108. The interaction detection logic 210 may store the group canvas shared surface object record 248 in the shared surface object repository 106. The interaction detection logic 210 may update each of the local canvases (e.g., 122, 124 and 126) with the update of the local canvas share surface object representations 246 and the respective update of the local canvas (e.g., 250). In other words, in one implementation, the interaction detection logic 210 updates a local canvas share surface object representation with updates that result from local manipulations 236 before updating the local canvas share surface object representation with a corresponding update of the group canvas share surface object representation. The interaction detection logic 210 may retrieve the group canvas shared surface object record 248 from the shared surface object repository 106, using the shared surface object identifier (e.g., 216), and update the local canvas shared surface object representation 246 using the group canvas shared surface object record 248.

Figure 3:
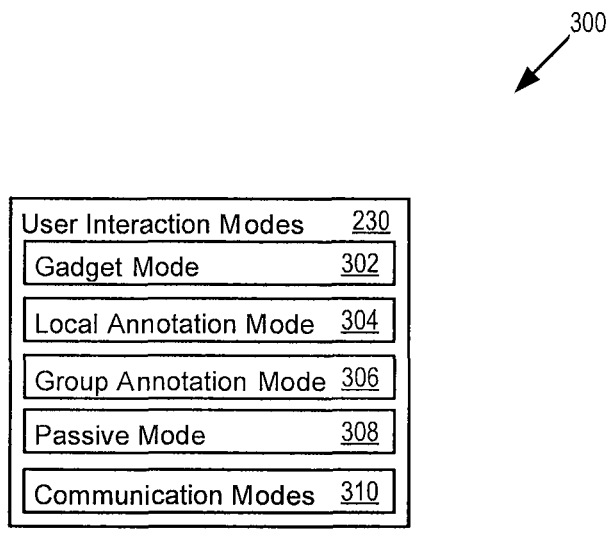
FIG. 3 shows user interface modes.

FIG. 3 illustrates user interaction (UI) modes 230 of the system 102. The user interaction modes 230 include local canvas UI modes (e.g., first LC UI mode 226) and group canvas UI modes (e.g., first GC UI mode 228). The local canvas UI mode (e.g., 226) may be user configurable. The group canvas UI mode (e.g., 228) may be configurable by an administrator, the 102 system, and/or at least one of the multiple users 104 with the authorization to set the group canvas UI mode. The user interaction modes for both the local canvas UI modes and group canvas UI modes include a gadget mode 302, a local annotation mode 304, a group annotation mode 306, passive mode 308 and communication modes 310. One or more of the user interaction modes 230 may be concurrently specified in order to configure a local canvas and/or group canvas.

Figure 13:
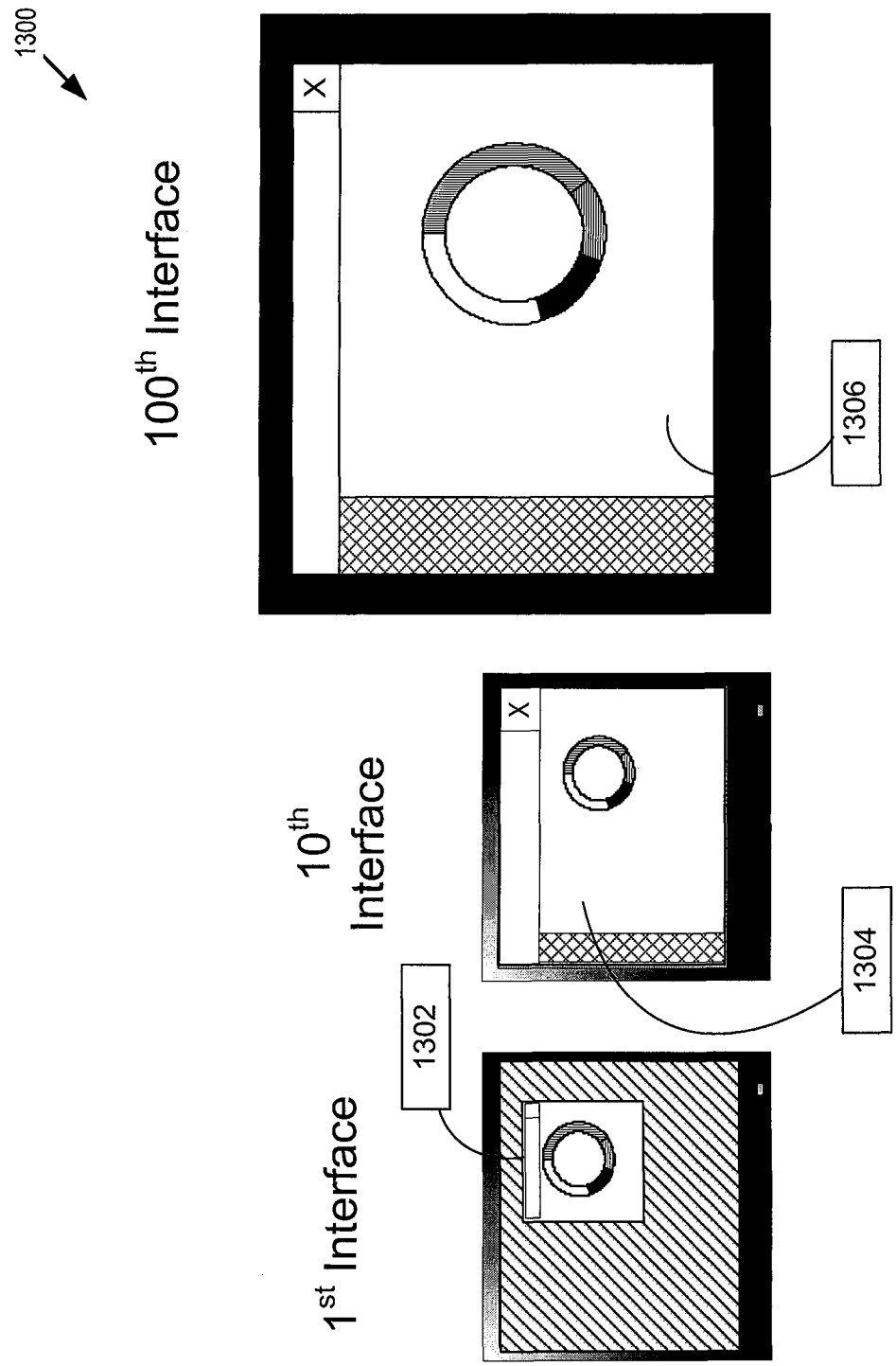
FIG. 13 shows local canvases of varying sizes set to different user interaction modes.

Referring briefly to FIG. 13, local canvases of varying sizes set to different user interaction modes 1300 are shown. Local canvases may be used in a variety of settings, sizes and user interaction modes, including: a miniature size 1302, as a desktop computer gadget or widget; the display size of a computer 1304, suitable for direct viewing and interaction by a local canvas user; a large size 1306 (e.g., on a projected surface in a meeting room), in a passive read-only mode for group visibility; and large size in an interactive mode on a digital whiteboard or a touchable interactive wall. A local canvas may be scaled up with the use of digital whiteboards, touch displays, and/or large interactive walls. A local canvas may be used with an interactive wall for a user that desires to review existing contents, arrange the content and/or sketch over the content.

Returning to FIG. 3, the gadget mode 302 may provide an awareness function that indicates the mode of each of the local canvases corresponding to a group canvas. The awareness function of the gadget mode 302 may also allow the system 102 to present the group user status 260 and group user identifier 262 of each group canvas user to which the local canvas corresponds (e.g., a buddy list in messaging program). The system 102 may use the awareness function information of the gadget mode 302 to present an icon and/or avatar that indicates the local canvas UI mode (e.g., 226), the group canvas user status 260 and the group canvas user identifier 262 to which a local canvas user corresponds. In one implementation, a local canvas user may disable the gadget mode 302 of the local canvas user so that the local canvas user may interact with the local canvas in a cloaked mode and corresponding group canvas users cannot discover the group user status 260 and group user identifier 262 of the local canvas user. In one implementation, the gadget mode 302 may present a local canvas in a miniature size, with a reduced amount of visual detail, at the edge of the screen. When group canvas users modify a group canvas share surface object representation, a visual indicator may appear across the gadget and then slowly fade over time, so that the gadget makes the local canvas user peripherally aware of the share surface object.

Figure 12:
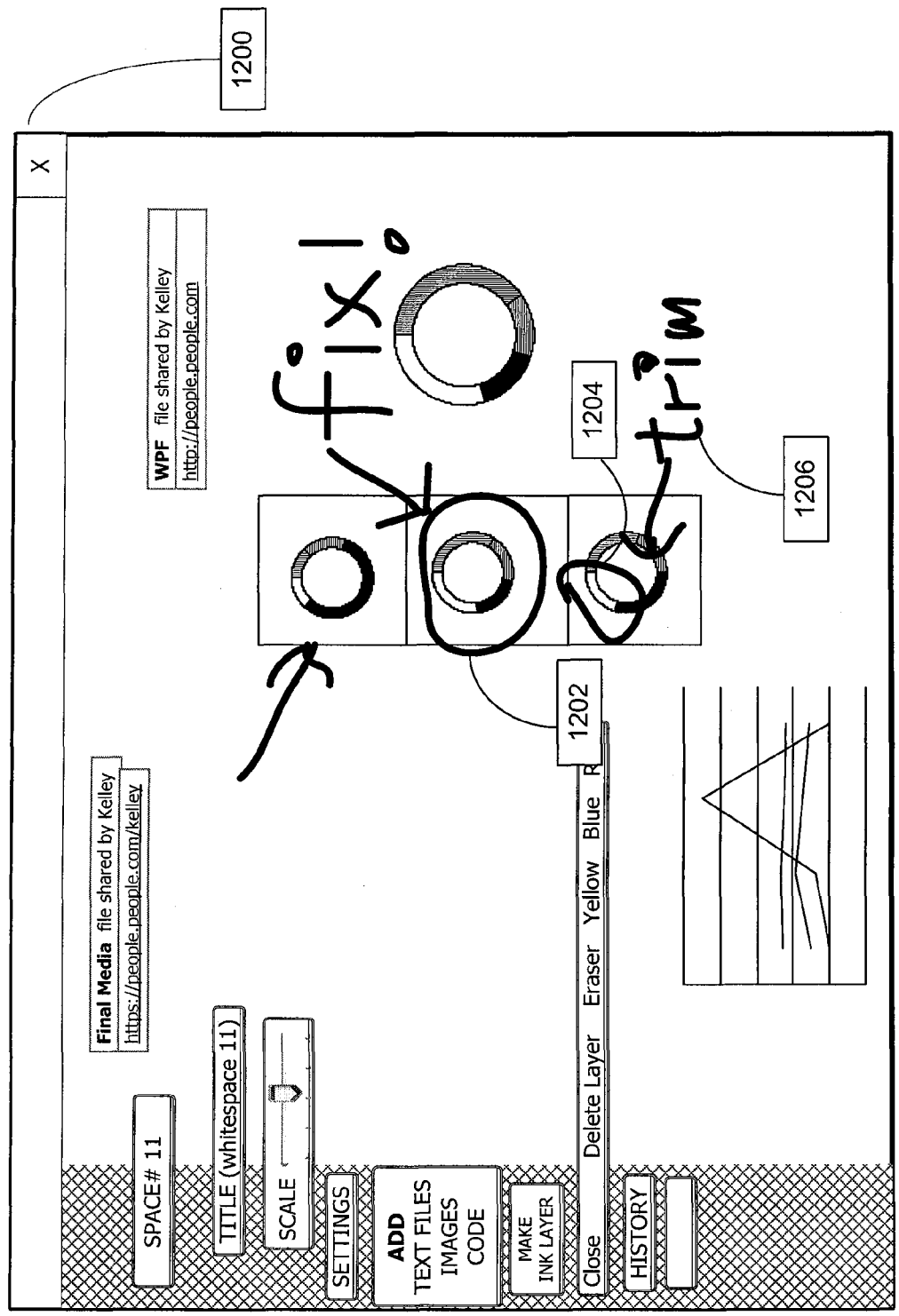
FIG. 12 illustrates a local canvas comprising a semi-transparent annotation layer overlaying local canvas shared surface object representations.

Referring briefly to FIG. 12, a local canvas comprising a semi-transparent annotation layer overlaying local canvas shared surface object representations 1200 is shown. The system may employ a semi-transparent annotation 'layer' (e.g., 1202, 1204 and 1206) to overlay a local canvas shared surface object representation with local and/or group annotations, allowing for non-destructive highlighting, commentary, annotation and markup. Returning to FIG. 3, the local annotation mode 304 may allow updates of a local canvas and local canvas shared surface object representation, in response to a respective local canvas user interaction with the local canvas, while preventing the local canvas user interaction to be used to update a corresponding group canvas. In other words, the local annotation mode 304 may allow local canvas interactions to be limited to the corresponding local canvas. For example, under the local annotation mode 304 a local canvas interaction corresponding to a first local canvas is used to update the first local canvas, but the system 102 does not use the local canvas interaction to update a second local canvas that corresponds to a group canvas that the first local canvas also corresponds. The system 102 may allow a user to store local annotations separately from group annotations so that local canvas and group canvas annotations can be maintained.

The group annotation mode 306 may allow updates of the local canvases corresponding to a group canvas, in response to a local canvas user interaction with at least one of the local canvases corresponding to the group canvas. The group annotation mode 306 may represent the most collaborative of the user interactive modes 230. In one implementation, the group annotation mode 306 may allow a local canvas user to specify a group canvas user from which the local canvas user will accept and/or exclude interactions, based on the authority and/or role of the local canvas user.

The passive mode 308 may set a local canvas to read-only to prevent updates of a local representation in response to a local canvas user interaction with the local canvas. The passive mode 308 may not prevent updates of the local canvas with a corresponding group canvas representation. In one implementation, the system 102 may use the passive mode 308 as a default for local canvases that do not have local canvas user interaction capabilities. For example, a local canvas may be presented in a graphical display area of a kiosk that does not provide local canvas user interaction capabilities. In another example, a local canvas may be set to passive mode 308 and displayed on a physically large screen (e.g., wall) for a group of people to occasionally use for a meeting and/or brainstorming session and/or continuously use as a shared group display and/or bulletin board.

In one implementation, a group canvas may be accessed using a machine-consumable web service and/or RSS feed (e.g., really simple syndication) using an RSS reader (e.g., iGoogle® and Google Reader®). A user interaction with a shared surface object may trigger the creation of an event, task and/or email. A web service (e.g., service provider) may be configured with a watch list of user interactions that trigger the initiate events, tasks and/or emails. For example, a group canvas may be monitored for interactions that correspond to a particular subject and/or manipulation of a particular shared surface object. The user interaction may represent and/or result in the creation of an assignment and/or completion of a task by a user and/or group of users. A task and status of the task may be communicated simultaneously to multiple applications used to track the progress of tasks (e.g., Microsoft Project®, Outlook Tasks®, and/or a Calendar) so that the system may be used to impose a workflow. For example, a canvas user may create a text snippet and designate the text snippet a task corresponding to a workflow of an organization, assign the task and send the task to the assignee. The task becomes a task item on the canvas and reflects the status (e.g., in-progress, unassigned, and complete). A service provider may monitor task tracking applications for completion of a task and communicate the status of the task to a corresponding group canvas.

The communication mode 310 allows each local canvas user to specify one or more preferred methods of communication to use when communicating with group canvas users corresponding to a group canvas that the local canvas user corresponds. The communication mode 310 may include any combination of communication methods, including: text; multimedia web cam; audio; and e-mail. In one implementation, local canvases comprise built-in audio conference and/or video conference links so that a corresponding local canvas user may communicate with corresponding group canvas users (e.g., connecting to a 'party line').

The system 102 evaluates the communication mode 310 of a local canvas user and a group canvas user to determine the one or more communication methods available for communications between the local canvas user and the group canvas user. For example, a local canvas user may set the communication mode 310 to indicate a particular written and/or spoken language that is different from the written and/or spoken language indicated by the group canvas user. The system 102 may translate content between to two languages so that the local canvas user and the group canvas user can communicate. Similarly, a local canvas user may set the communication mode 310 to indicate that a non-display peripheral be used because the user is visually impaired.

For example, a group canvas user may specify audio as the communication mode 310, while the local canvas user may specify text as the communication mode 310. The local canvas user may select the icon and/or avatar corresponding to the group canvas user to which the local canvas user corresponds to initiate communication with the group canvas user. The system 102 evaluates the communication modes 310 and when the local canvas user originates a text message to the group canvas user the system 102 translates the text message into an audio message for the group canvas user, and when the group canvas user originates an audio message (e.g., response or reply) the system translates the audio message into a text message.

The system 102 may evaluate each of the communication modes 310 specified by the local canvas user and group canvas user, respectively, and determine a combination of communication methods provide the best communication method. For example, although a local canvas user and group canvas user both specify multimedia web cam as the communication mode 310, the system 102 may determine the multimedia web cam quality of service unreliable and to ensure that the local canvas user and group canvas user receive the communications between the two use text and/or e-mail messaging to send a written transcript of the multimedia web cam to both the local canvas user and group canvas user.

The group canvas UI modes (e.g., 228) supersede the local canvas UI modes (e.g., 226) of corresponding local canvases. An administrator and/or collaboration leader may configure how the group canvas UI modes (e.g., 228) supersede the local canvas UI modes (e.g., 226). For example, a group canvas set to the group canvas UI mode of local annotation mode 304 limits the local canvas UI modes to which a local canvas may be set to only include: local annotation mode 304; passive mode 308; and communication mode 310. An administrator and/or collaboration leader may set the group canvas UI mode (e.g., 228) to local annotation mode 304 so that a local canvas is only updated in response to user interactions with a corresponding administrator and/or collaboration leader canvas and in response to a user interaction with the respective local canvas.

A group canvas UI mode (e.g., 228) set to local annotation mode 304 may prevent a local canvas from being updated in response to user interactions with other local canvases corresponding to the group canvas, except in response to user interactions with the administrator and/or collaboration leader canvas. An administrator and/or collaboration leader may set the group canvas UI mode (e.g., 228) to passive mode 308 so that a local canvas is only updated in response to user interactions with a corresponding administrator and/or collaboration leader canvas. A group canvas UI mode (e.g., 228) set to passive mode 308 may prevent a local canvas from being updated, except in response to user interactions with the administrator and/or collaboration leader canvas. The group canvas UI mode (e.g., 228) set to group annotation mode 306 may allow the local canvas UI mode (e.g., 226) to which a local canvas may be set to include: the gadget mode 302; the local annotation mode 304; the group annotation mode 306; the passive mode 308; and the communication mode 310.

Figure 4:
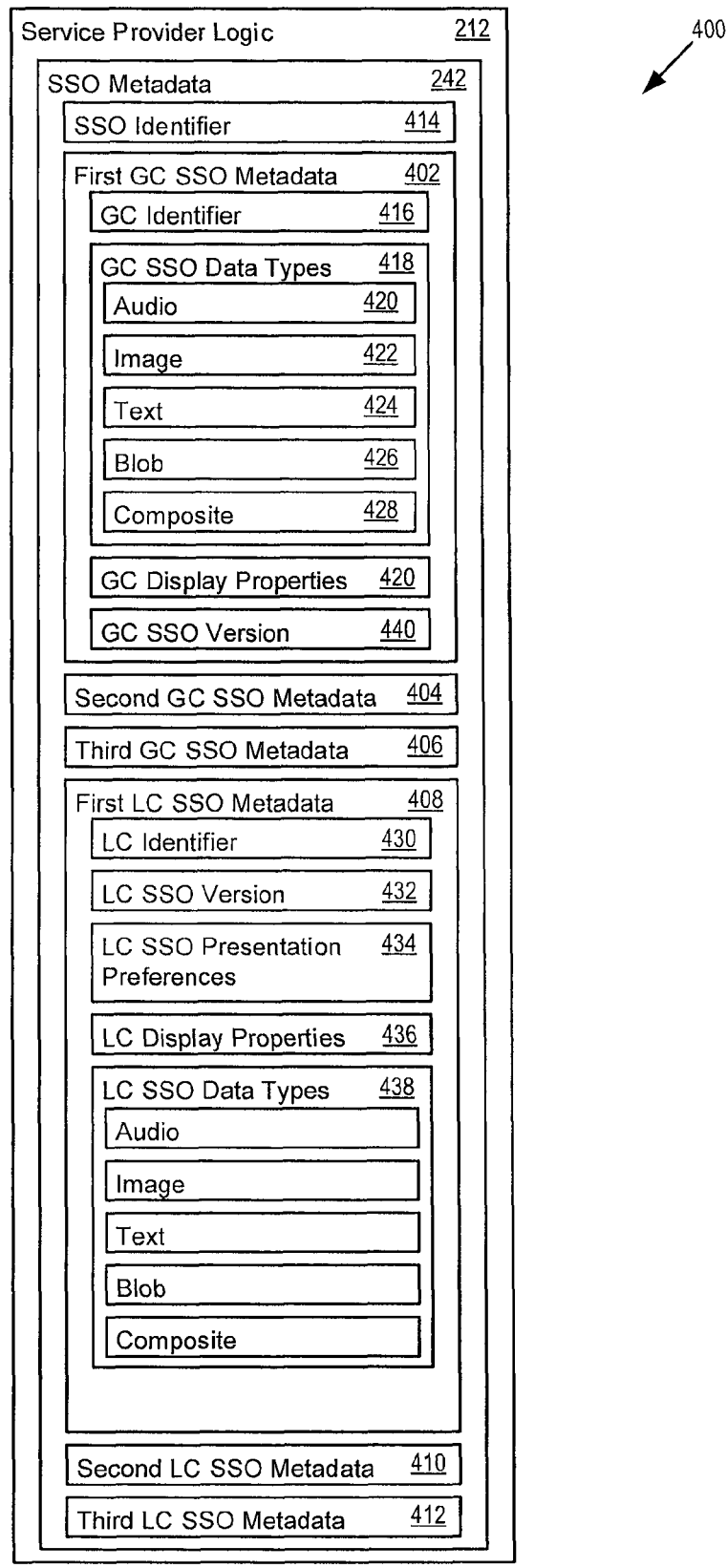
FIG. 4 shows shared surface object metadata.

FIG. 4 shows shared surface object metadata 242. The shared surface object metadata of a shared surface object includes: group canvas shared surface object metadata (e.g., 402, 404, and 406) that corresponds to each group canvas shared surface object representation; local canvas shared surface object metadata (e.g., 408, 410, and 412) that corresponds to each local canvas shared surface object representation; and a shared surface object identifier 414. The group canvas shared surface object metadata (e.g., 402, 404, and 406) includes: a group canvas identifier 416 that identifies the group canvas to which the shared surface object corresponds; a group canvas shared surface object data type 418; and group canvas display properties 420; a group canvas shared surface object version 440. The group canvas identifier 416 identifies a group canvas the boundaries of which at least a portion of a local canvas shared surface object representation is within. The group canvas shared surface object data type 418 may be from a group of data types consisting of: audio 420; image 422; text 424; blob 426; and composite 428 that comprises a combination of any two or more of the data types from the group of data types. The group canvas shared surface object data type 418 may include multiple content types, including text snippets, freehand sketches and annotations, images, pointers to shared files, live web pages, and multi-media conferences.

The local canvas shared surface object metadata (e.g., 408, 410, and 412) includes: a local canvas identifier 430; a local canvas shared surface object version 432; local canvas shared surface object presentation preferences 434; local canvas display properties 436; and a local canvas shared surface object data type 438. The local canvas identifier 430 identifies the local canvas the boundaries of which at least a portion of the local canvas shared surface object representation is within.

The local canvas shared surface object version 432 specifies the time stamp of a last local manipulation of the local canvas shared surface object representation. The system 102 may use the local canvas shared surface object version 432 to determine how the local canvas shared surface object is presented in the local canvas. The system 102 may also use the local canvas shared surface object version 432 to determine a priority ranking of simultaneous local manipulations of local canvas shared surface object representation. For example, a local manipulation corresponding to a more recent local canvas shared surface object version 432 value may correspond to lower priority ranking. In other words, a simultaneous local manipulation of a local canvas shared surface object representation with the most recent local canvas shared surface object version 432 may be used to generate the corresponding group canvas shared surface object representation.

In one implementation, an administrator of the system 102 may configure the local canvas shared surface object metadata (e.g., 408, 410, and 412) to correspond to the group canvas shared surface object metadata (e.g., 402, 404, and 406). The group canvas shared surface object metadata (e.g., 402, 404, and 406) may determine the range of values and types of available local canvas shared surface object metadata (e.g., 408, 410, and 412). The service provider logic 212 may analyze the resources available to a local canvas and/or the configuration of the local canvas to determine the availability of particular local shared surface object presentation preferences 434, the local canvas display properties 436 and the available local canvas shared surface object data types 438. The service provider logic 212 may analyze the local canvas shared surface object presentation preferences 434, the local canvas display properties 436 and the available local canvas shared surface object data types 438 to determine whether to update a local canvas shared surface object representation using a translation of a corresponding group canvas shared surface object data type 418.

For example, a group canvas shared surface object data type of a group canvas shared surface object representation may correspond to a composite group canvas shared surface object data type 428 that comprises the data types of audio 420 and image 422, while local canvas shared surface object presentation preferences 434 may indicate a preference for text. The corresponding local display properties 436 may also indicate that audio is unavailable. The service providers 108 responsive to translating audio (e.g., a song arranged with vocals and instruments) to text (e.g., lyrics to a song and/or musical notation of the arrangement of the song) may translate the group canvas share surface object data type 418 so that the local canvas shared surface object representation is presented in the local canvas as text.

Figure 5:
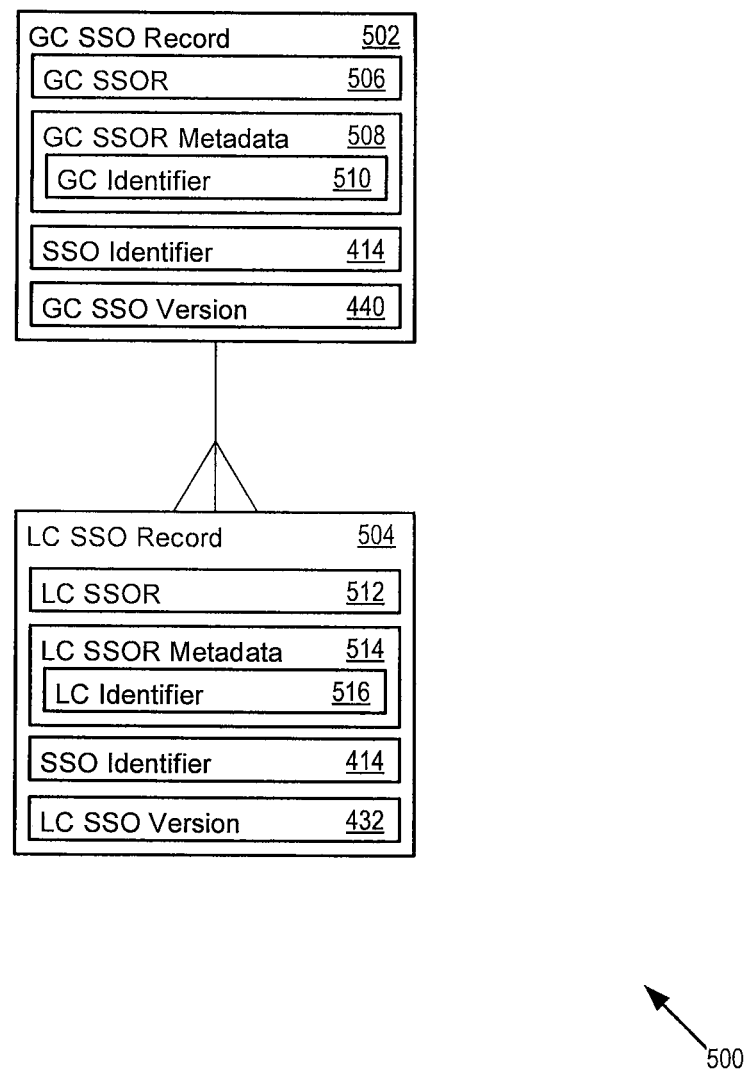
FIG. 5 shows a group canvas shared surface object record.

FIG. 5 illustrates shared surface object records 500, including a group canvas shared surface object record 502 and a local canvas shared surface object record 504. The system 102 may maintain and store in the shared surface object repository 106, for each group canvas shared surface object representation 506, a group canvas shared surface object record 502 comprising the group canvas shared surface object representation 506 based on the shared surface object metadata 242 and the updates of the local canvas shared surface object representation 246 received from the service provides 108. The group canvas shared surface object record 502 further includes group canvas shared surface object representation metadata 508 (e.g., 402, 404 and 406), and a group canvas identifier 510 (e.g., 416) that identifies the group canvas in which a portion of the local canvas shared surface object representation 232 is within the group canvas boundaries of (e.g., 224).

The group canvas identifier 510 and shared surface object identifier 414 together uniquely identify the group canvas shared surface object representation 506. In other words, multiple group canvases (e.g., 116, 118 and 120) may comprise, within the group canvas boundaries of the respective group canvases, at least a portion of a group canvas shared surface object representation 506. The system 102 may use the group canvas identifier 510 and shared surface object identifier 414 together to uniquely identify each group canvas shared surface object representation 506.

The system 102 may maintain and store in the shared surface object repository 106 a local canvas shared surface object record 504 for each local canvas shared surface object representation 512 (e.g., 232). The local canvas shared surface object record 504 includes the local canvas shared surface object representation 512 based on the local canvas shared surface object metadata 514 (e.g., 408, 410 and 412) and the local canvas manipulations (e.g., 236 and 238) corresponding to the respective local canvas (e.g., 122, 124 and 126). The local canvas shared surface object record 504 further includes a local canvas identifier 510 (e.g., 430) that identifies the local canvas in which at least a portion of the local canvas shared surface object representation 512 (e.g., 232) is within the local canvas boundaries of (e.g., 214). The local canvas identifier 516 and shared surface object identifier 414 together uniquely identify the local canvas shared surface object representation 232.

Figure 6A:
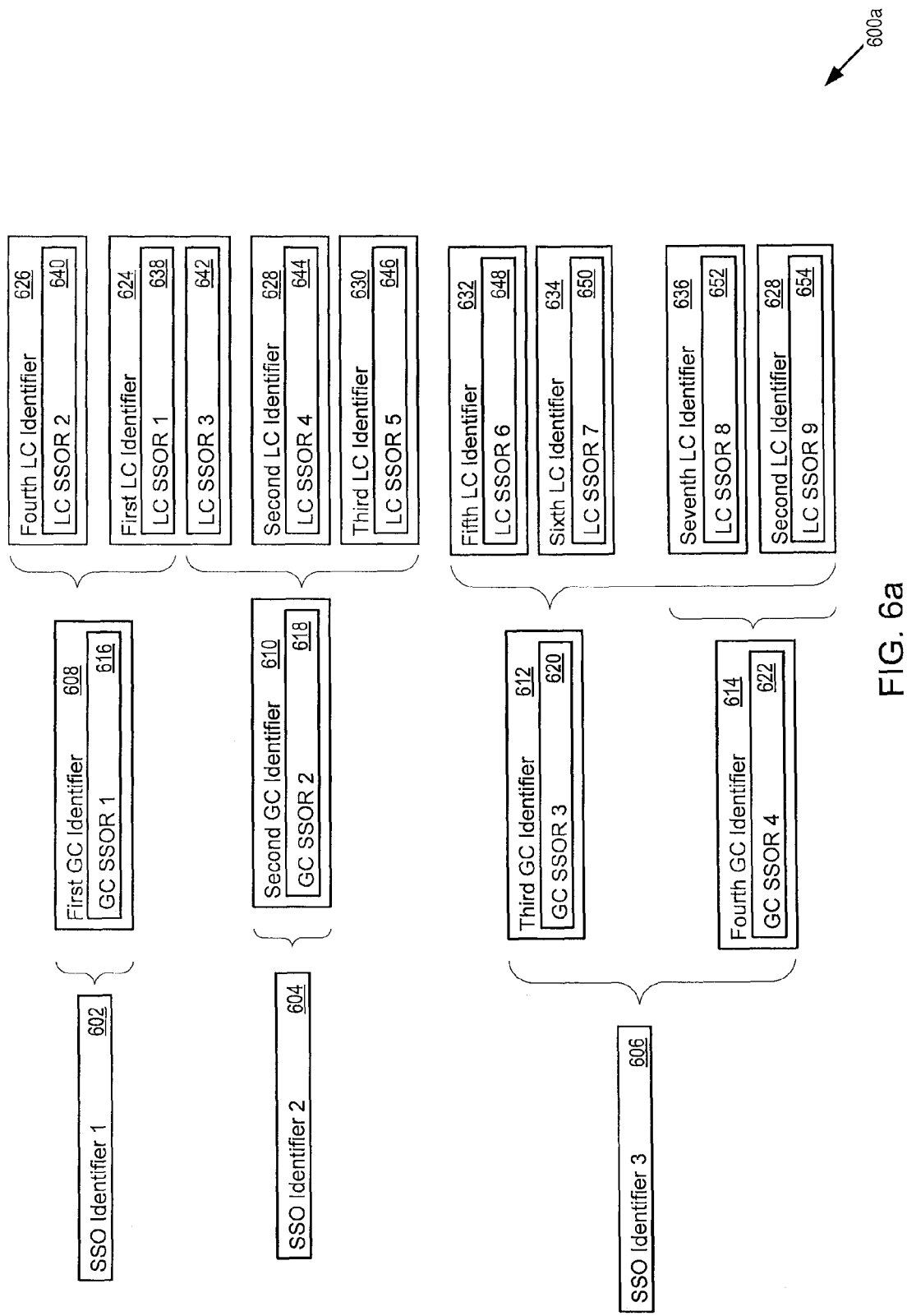
FIG. 6a shows correlations between shared surface objects, group canvases, group canvas shared surface object representations, local canvases and local canvas shared surface object representations.

FIG. 6a shows correlations between shared surface objects, group canvases, group canvas shared surface object representations, local canvases and local canvas shared surface object representations 600a. FIG. 6a illustrates an example correlation of shared surface object identifiers (e.g., 602, 604, and 606) corresponding to shared surface objects, group canvas identifiers (e.g., 608, 610, 612, and 614), group canvas shared surface object representations (e.g., 616, 618, 620, and 622), local canvas identifiers (e.g., 624, 626, 628, 630, 632, 634, and 636) and local canvas shared surface object representations (e.g., 638, 640, 642, 644, 646, 648, 650, 652 and 654).

A shared surface object may correspond to a group canvas comprising a group canvas shared surface object representation, where the group canvas corresponds to multiple local canvases comprising multiple local canvas shared surface object representations. For example, a shared surface object identified by the shared surface object identifier 602 may correspond to a group canvas (e.g., identified by group canvas identifier 608) comprising a group canvas shared surface object representation (e.g., 616) and corresponding to local canvases (e.g., identified by local canvas identifiers 624 and 626). The local shared surface object representations (e.g., 638 and 640) of the shared surface object identified by the shared surface object identifier 602 correspond to respective local canvases (e.g., identified by local canvas identifiers 624 and 626).

Figure 6B:
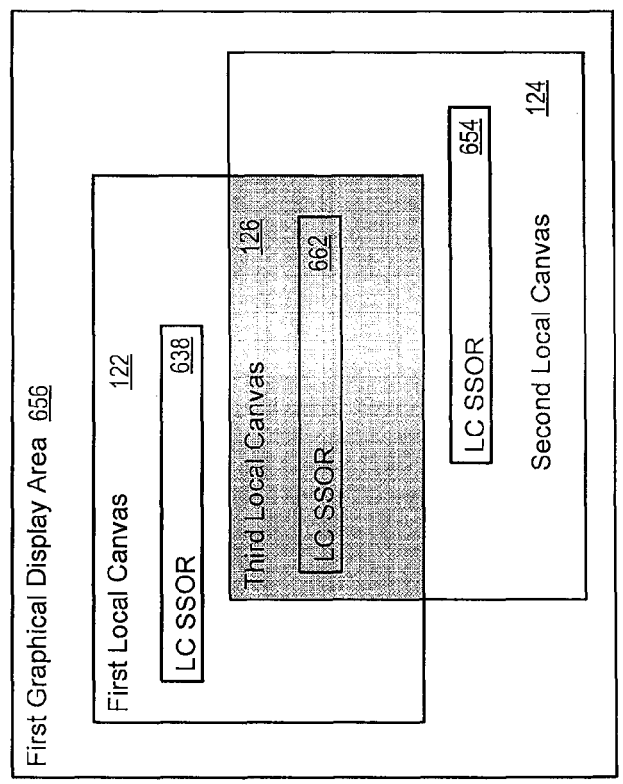
FIG. 6b shows a first graphical display area with multiple local canvases corresponding to multiple group canvases.
Figure 6C:
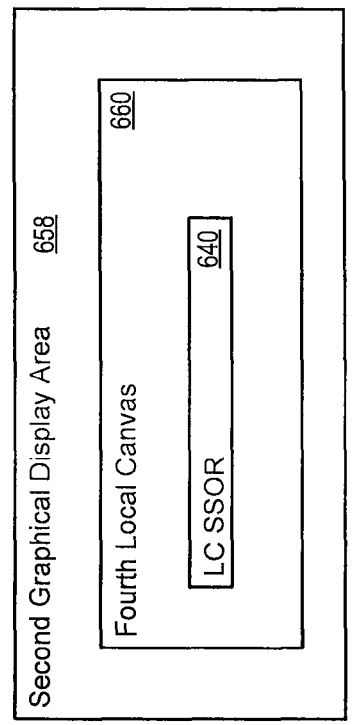
FIG. 6c shows a second graphical display area with a local canvas corresponding to a group canvas.

FIG. 6b illustrates a first graphical display area 656 that includes a first local canvas 122 (e.g., identified by local canvas identifier 624) comprising the local canvas shared surface object representation 638 corresponding to the shared surface object identified by the shared surface object identifier 602. FIG. 6c illustrates a second graphical display area 658 that includes a fourth local canvas 660 (e.g., identified by local canvas identifier 626) comprising the local canvas shared surface object representation 640 corresponding to the shared surface object identified by the shared surface object identifier 602. The first graphical display area 656 and the second graphical display area 658 may represent multiple respective sources through which a shared user interface surface (e.g., a group canvas identified by group canvas identifier 608) is accessible simultaneously by multiple users. In other words, multiple users may use respective graphical display areas (e.g., 656 and 658) to simultaneously manipulate local canvas shared surface object representations (e.g., 638 and 640) of a shared surface object within corresponding local canvases (e.g., 624 and 626).

FIG. 6b further illustrates the first local canvas 122 (e.g., identified by local canvas identifier 624), a second local canvas 124 (e.g., identified by local canvas identifier 628) and a third local canvas 126 (e.g., identified by local canvas identifier 630) comprising respective local canvas shared surface object representations 662 (e.g., 642, 644 and 646) corresponding to the shared surface object identified by the shared surface object identifier 604. Although shown as one local canvas shared surface object representation 662, each local canvas (e.g., 122, 124 and 126 comprise a respective local canvas shared surface object representation (e.g., 642, 644 and 646) corresponding to the shared surface object identified by the shared surface object identifier 604.

FIG. 6b illustrates that the first local canvas and the second local canvas comprise local canvas boundaries, respectively, where at least a portion of the respective local canvas boundaries common to the first local canvas 122 and the second local canvas 124 may define the third local canvas 126. The first local canvas 122 and the second local canvas 124 may define the third local canvas 126 may correspond to a group canvas (e.g., 610) comprising group canvas boundaries corresponding to at least a portion of the first local canvas boundaries, the second local canvas boundaries and third local canvas boundaries common to the respective local canvases.

A shared surface object may correspond to multiple group canvases and local canvases comprising respective group canvas shared surface object representations and local canvas shared surface object representations. For example, a shared surface object identified by the shared surface object identifier 606 may correspond to multiple group canvases (e.g., identified by group canvas identifiers 612 and 614) and corresponding local canvases (e.g., identified by local canvas identifiers 632, 634, 636 and 628). The local shared surface object representations (e.g., 646, 648, 650 and 652) of the shared surface object identified by the shared surface object identifier 606 correspond to respective local canvases (e.g., identified by local canvas identifiers 632, 634, 636 and 628). The group canvases may comprise corresponding group canvas shared surface object representations (e.g., 620 and 622) that correspond to the shared surface object identified by the shared surface object identifier 606.

Figure 6D:
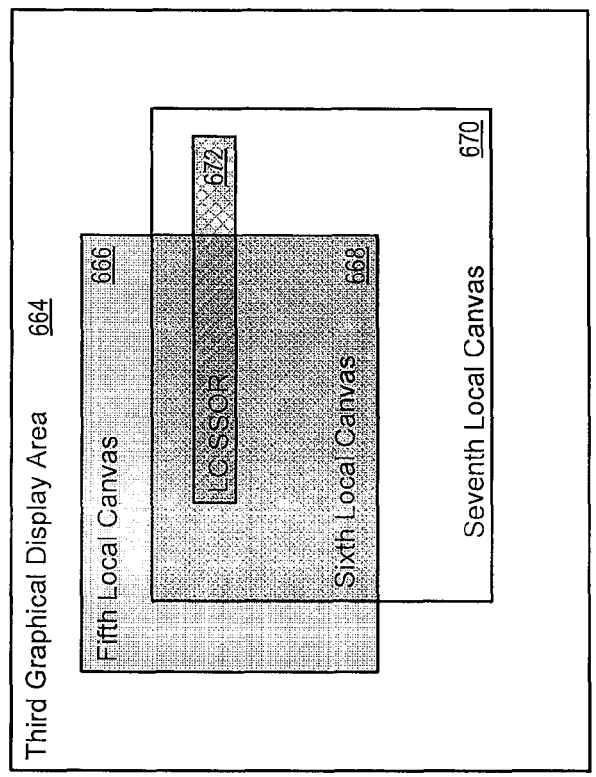
FIG. 6d shows a third graphical display area with multiple local canvases corresponding to multiple group canvases.

A local canvas may comprise a local canvas shared surface object representation of which at least two different portions correspond to at least two different group canvases. Multiple portions of a local canvas (e.g., 122) may correspond to different group canvases (e.g., group canvases identified by group canvas identifiers 616 and 618). A local canvas (e.g., 122) may indicate the group canvas identifiers 232 (e.g., 616 and 618) to which the local canvas corresponds. FIG. 6b illustrates the second local canvas 124 (e.g., identified by local canvas identifier 628) comprising local canvas shared surface object representation 654 of the shared surface object identified by the shared surface object identifier 606. FIG. 6d illustrates a third graphical display area 664 comprising a fifth local canvas 666, sixth local canvas 668 and seventh local canvas 670 (e.g., identified by local canvas identifiers 632, 634 and 636, respectively).

FIGS. 6b and 6d illustrate that the portions of the shared surface object common to the second local canvas 124, fifth local canvas 666, sixth local canvas 668 and seventh local canvas 670 may correspond to the third group canvas identified by the group canvas identifier 612, while the local representations of the entire shared surface object common to the second local canvas 124 and seventh local canvas 670 may correspond to a fourth group canvas identified by the group canvas identifier 614. The second local canvas 124, fifth local canvas 666, sixth local canvas 668 and seventh local canvas 670 comprise respective local canvas shared surface object representations 672 (e.g., 648, 650, 652 and 654) corresponding to the shared surface object identified by the shared surface object identifier 606. Although shown in FIG. 6d as one local canvas shared surface object representation 672, each local canvas (e.g., 124, 666, 668 and 670) comprises a respective local canvas shared surface object representation (e.g., 648, 650, 652 and 654) corresponding to the shared surface object identified by the shared surface object identifier 606. FIG. 6d illustrates that the respective local canvas shared surface object representations 672 (e.g., 648 and 650) represent a portion of the shared surface object, as shown in the fifth local canvas 666 and sixth local canvas 668, while the respective local canvas shared surface object representations 672 (e.g., 652 and 654) of the second local canvas 124 and seventh local canvas 670 represent the entire shared surface object.

Figure 7:
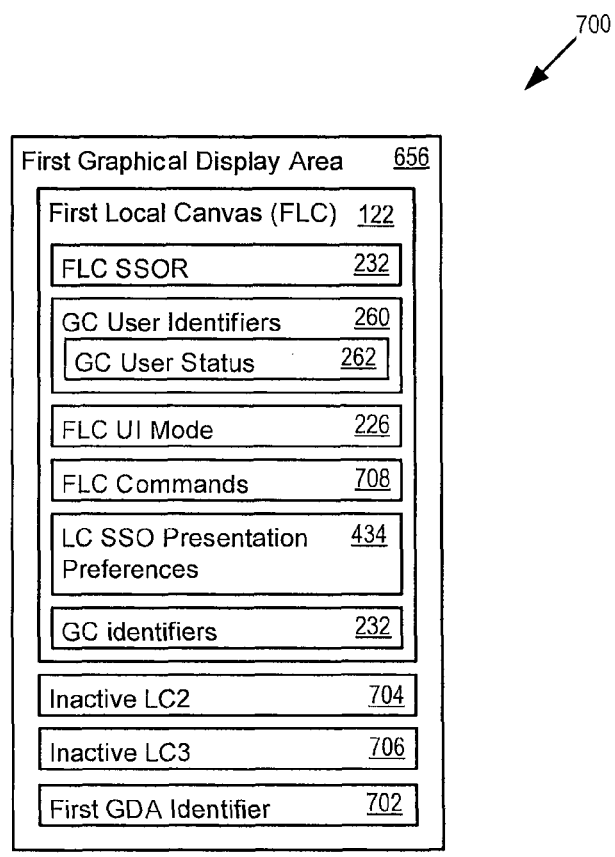
FIG. 7 illustrates graphical display area components of a graphical display area.

FIG. 7 illustrates example graphical display area components 700 of a graphical display area 656. A graphical display area may comprise, in addition to a local canvas (e.g., 122), a graphical display area identifier (e.g., 702) that uniquely identifies the graphical display area (e.g., 656) and inactive local canvases (e.g., 704 and 706). An inactive local canvas (e.g., 704 and 706) represents a local canvas where a local canvas manipulation (e.g., 236 and 238) of the local canvas and/or a local canvas shared surface object representation has not occurred in some specified period of time. The system 102 may use visual queues to indicate that the inactive local canvases (e.g., 704 and 706) are inactive. For example, the local canvas boundaries of the inactive local canvases may each comprise distinct patterns and color. The system 102 may modify the pattern, color and/or size of an inactive canvas, as well as move the local canvas to a particular location within the corresponding graphical display area.

Figure 8:
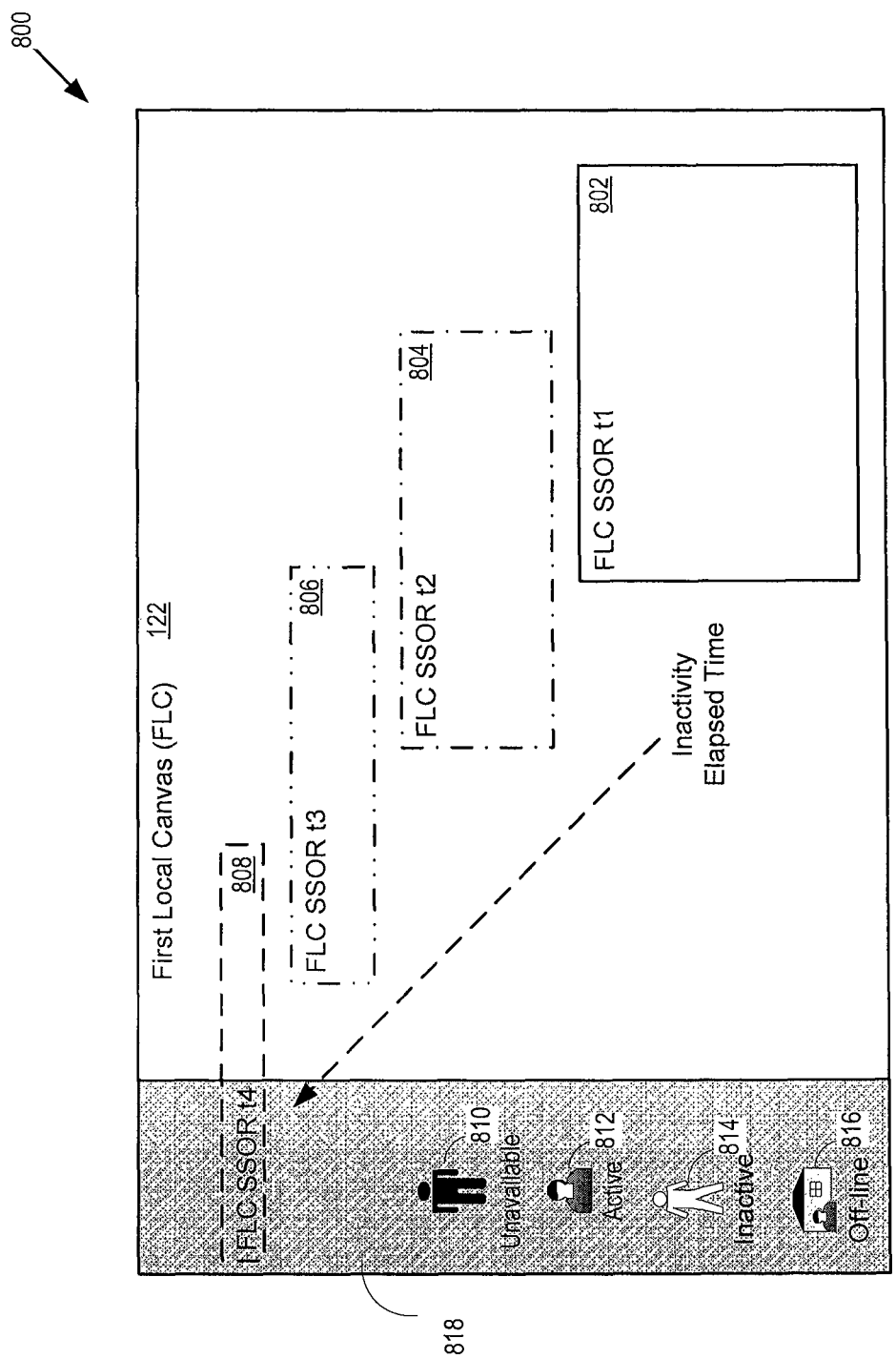
FIG. 8 illustrates a local canvas shared surface object representation over an elapsed time period during which no local canvas manipulation occurs.

FIG. 8 illustrates a local canvas shared surface object representation 800 over an elapsed time period during which no local canvas manipulation occurs. A local canvas user may configure the local canvas shared surface object presentation preferences 434 so that a local canvas shared surface object representation 802 is presented in a way that indicates a lack of local canvas manipulation of the local canvas shared surface object representation (e.g., 804, 806, and 808) over an elapsed time period. When no local canvas manipulations occur over an elapsed period of time, the local canvas shared surface object representation (e.g., 802, 804, 806, and 808) may change in size, pattern, color (e.g., fade) and reposition in the local canvas so that the local canvas shared surface object representation (e.g., 808) becomes less prominent. Inactive local canvas shared surface object representations and icons and/or avatars of group canvas users may be positioned into the local canvas side-bar 818. When a local canvas manipulation of a local canvas shared surface object representation (e.g., 804, 806 and 808) occurs, the visual appearance and position of the local canvas shared surface object representation 802 may be restored.

In one implementation, the local canvas tools 1120 include a history and playback feature that may be selected to view a local canvas at a particular point in time and playback the changes that have occurred to the local canvas over an elapsed period of time. The local canvas shared surface object representations of a local canvas may be individually played back and/or synchronized with other local canvas shared surface object representations of the local canvas. For example, the history of viewable changes to a first local canvas shared surface object representation may be played back synchronously with the audio history of a second local canvas shared surface object representation representing an audio record of a discussion that occurred during and about the modifications to the first local canvas.

The group canvas user identifier 260 and corresponding group canvas status 262 of each group canvas user corresponding to a group canvas to which the local canvas (e.g., 122) corresponds may be represented by an icon and/or avatar (e.g., 810, 812, 814 and 816) that uniquely identify the group canvas users. The icon and/or avatar (e.g., 810, 812, 814 and 816) may include colors, patterns and/or text to indicate the group canvas user identifier 260 and corresponding group canvas status 262 of a group canvas user. A local canvas user may select the icon and/or avatar (e.g., 810, 812, 814 and 816) to initiate communication with the user corresponding to the icon and/or avatar. The group canvas user may receive a request for communication from the local canvas user and optionally accept the request of the local canvas user to communicate. In one implementation, the icon and/or avatar of the group canvas user is brought to the foreground to begin a dialogue in a larger interaction frame (e.g., a group canvas shared surface object representation corresponding to the local canvas user and group canvas user).

Figure 9:
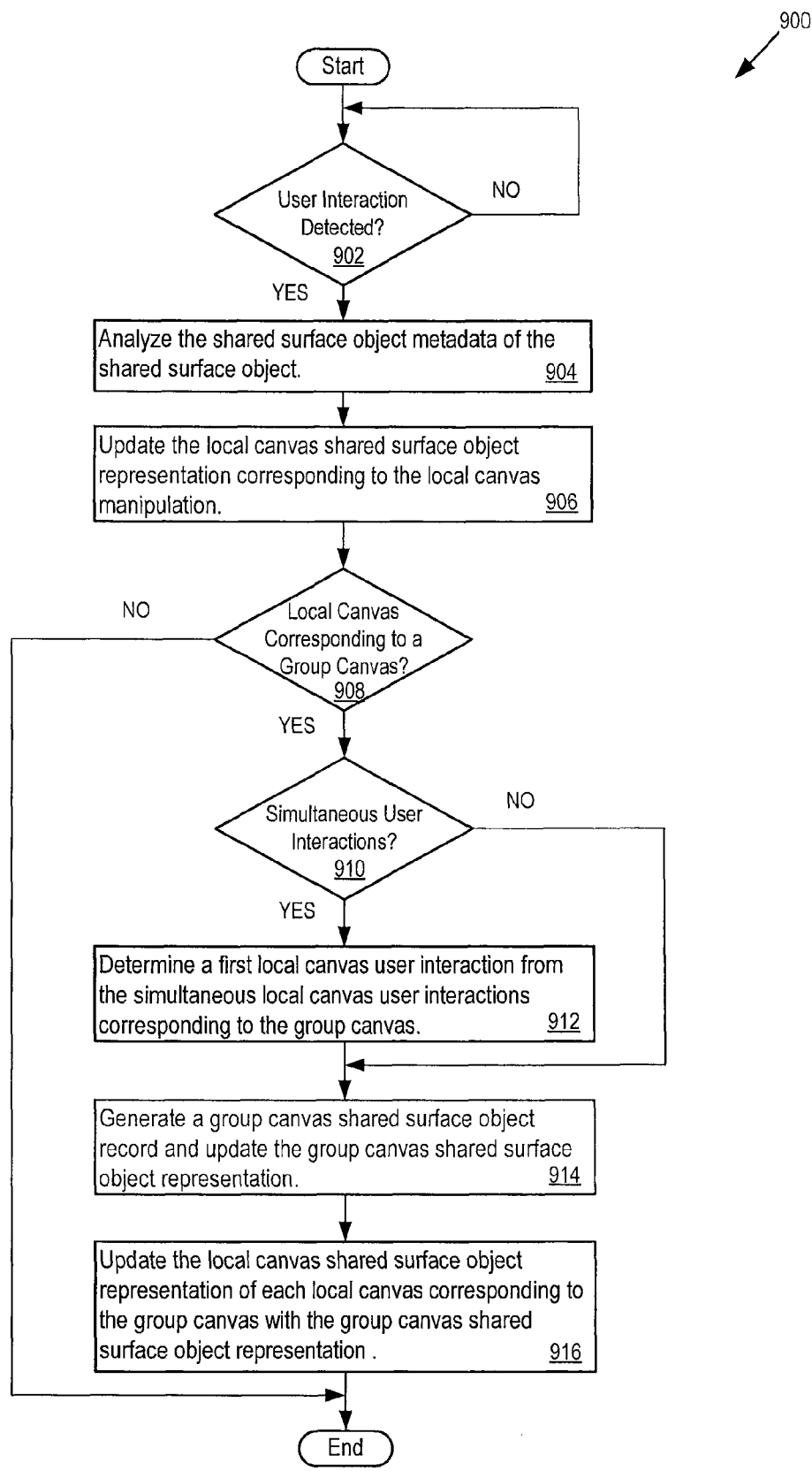
FIG. 9 shows the logic flow the shared user interface surface system may take to update a local canvas shared surface object representation.

FIG. 9 shows the logic flow 900 that the shared user interface surface system 102 may take to update a local canvas shared surface object representation 232. The interaction detection logic 210 detects a local canvas user interaction (902) comprising a local canvas manipulation 236 of a local canvas shared surface object representation 232. The service provider logic 212 analyzes the shared surface object metadata 242 corresponding to the local canvas shared surface object 232 and communicates the shared surface object metadata 242 and the local canvas manipulations of the local canvas shared surface object representations 244 to service providers 108 responsive to the local canvas shared surface object representation 232 (904).

The service providers 108 provide updates of the local canvas shared surface object representation 246 to the respective local canvases canvas manipulations of shared surface object representations 244 (906). The updates of the local canvas shared surface object representation 246 may be different for each local canvas until the local canvases are synchronized with an updated group canvas shared surface object representation. Where the local canvas user interaction corresponds to a group canvas (908) and the interaction detection logic 210 detects multiple simultaneous local canvas user interactions (910) that correspond to the group canvas (e.g., 118), the interaction detection logic 210 may identify a first local canvas user interaction from the simultaneous local canvas user interactions (912). In other words, the interaction detection logic 210 may consider one of the simultaneous local canvas user interactions to be the first local canvas user interaction. The interaction detection logic 210 updates the group canvas shared surface object representation 506 with the first local canvas shared surface object representation, and the group canvas shared surface object version 440 and the first local canvas shared surface object version 432 to correspond (914).

The interaction detection logic 210 may discard a second local canvas user interaction from the simultaneous local canvas user interactions that the interaction detection logic 210 identifies as a second local canvas user interaction. In one implementation, the second local canvas may discover the collision by polling the system for the state of the local canvas shared surface object representation and determine that the local canvas shared surface object representation is stale. The second local canvas may compare the local canvas shared surface object version and group canvas shared surface object version, and determine that the group canvas shared surface object version is more recent. The second local canvas may fetch the group canvas shared surface object representation to update the local canvas shared surface object representation and local canvas shared surface object version.

The interaction detection logic 210 may generate a group canvas shared surface object record 248, based on the shared surface object metadata 242 and the updates of the local canvas shared surface object representation 246 received from the service provides 108. The interaction detection logic may store the group canvas shared surface object record 248 in the shared surface object repository 106, and update the local canvas shared surface object representation 246 of each of the corresponding local canvases with the group representation (916). The interaction detection logic 210 may update the group canvases 252 (e.g., 254, 256, 258) with the group canvas shared surface object record 248 where at least a portion of the local canvas shared surface object representation (e.g., 232) is within the group canvas boundaries of the group canvases.

Figure 10:
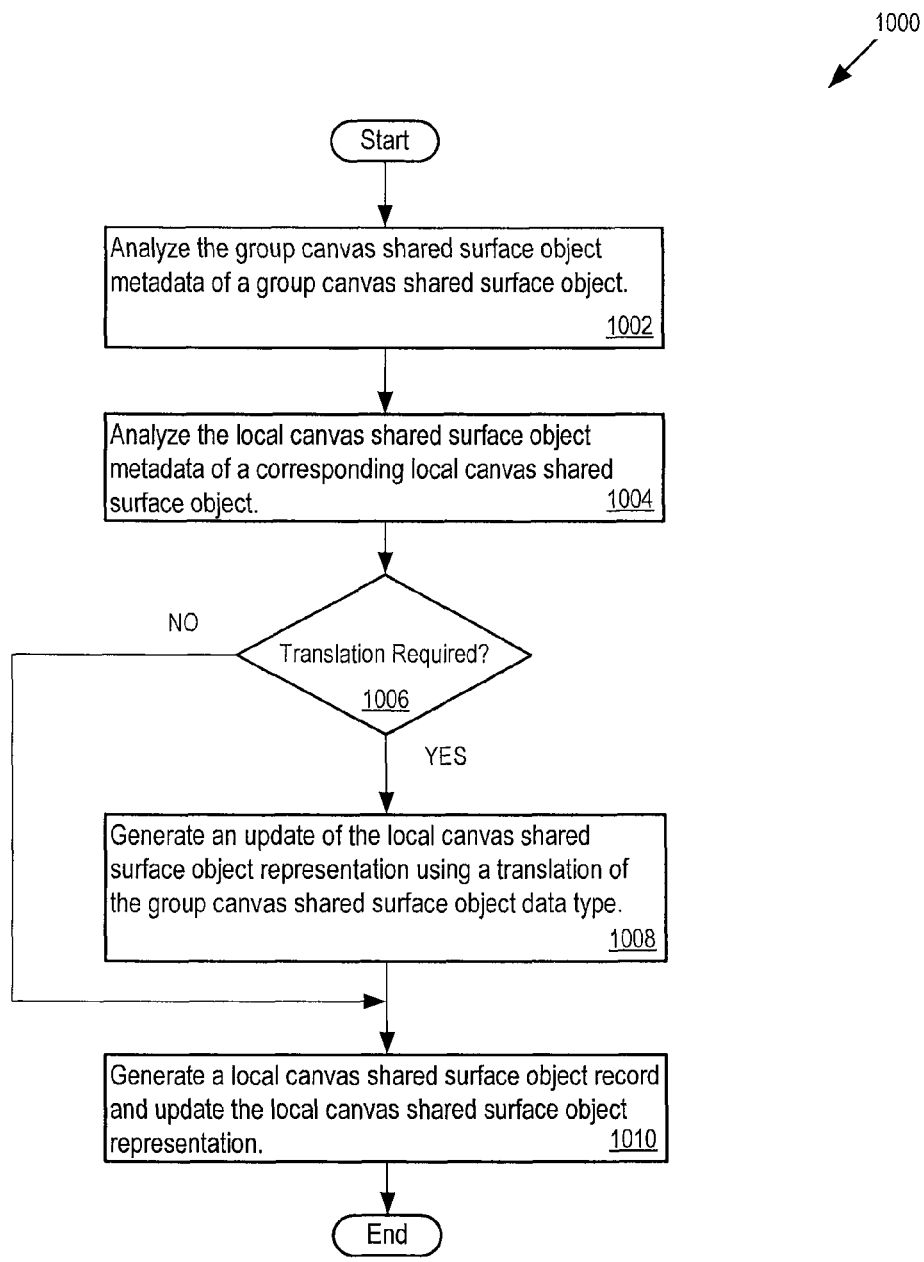
FIG. 10 shows the logic flow the shared user interface surface system may take to apply local canvas shared surface object presentation preferences.

FIG. 10 shows the logic flow 1000 that the shared user interface surface system 102 may take to apply local canvas shared surface object presentation preferences. The service provider logic 212 may analyze the group canvas shared surface object metadata 402 of a group canvas shared surface object representation (1002) and local canvas shared surface object metadata 408 of a corresponding local canvas shared surface object representation (1004).

The service provider logic 212 may analyze the group canvas shared surface object data types 418 and/or group canvas shared surface object display properties 420 in relation to the local canvas shared surface presentation preferences 434 and/or local canvas shared surface object display properties 420 to determine whether to use a translation (1006) of the group canvas shared surface object data types 418 to update the corresponding local canvas shared surface object representation and local canvas shared surface object metadata 408. For example, the group canvas shared surface object data type of a group canvas shared surface object representation may be audio (e.g., a song arranged with vocals and instruments), while the local canvas shared surface object presentation preferences 434 may indicate a preference for text. The corresponding local display properties 436 may also indicate that audio is unavailable.

The service providers 108 responsive to particular presentation preferences, data types and display properties may generate updates of the local canvas shared surface object representation 246 based on a translation of the group canvas shared surface object data types 418 (1008). For example, the service providers 108 responsive to translating audio (e.g., a song arranged with vocals and instruments) to text (e.g., lyrics to a song and/or musical notation of the arrangement of the song) may translate group canvas share surface object data types 418 (e.g., audio 420) to text so that a corresponding local canvas shared surface object representation is presented in the corresponding local canvas as text.

The interaction detection logic 210 may generate a local canvas shared surface object record 504 with the updates of the local canvas shared surface object representation 246 based on the translation of the group canvas shared surface object data types 418 and update the corresponding local canvas shared surface object representation (1010).

The system may be implemented in many different ways. For example, although some features are shown stored in computer-readable memories (e.g., as logic implemented as computer-executable instructions or as data structures in memory), all or part of the system, logic, and data structures may be stored on, distributed across, or read from other machine-readable media. The media may include hard disks, floppy disks, CD-ROMs, a signal, such as a signal received from a network or partitioned into sections and received in multiple packets communicated across a network. The system may be implemented in software, hardware, or a combination of software and hardware. The system may also use different message formats, in addition to XML, such as encoded packets with bit fields that are assigned specific meanings.

Furthermore, the system may be implemented with additional, different, or fewer components. As one example, a processor or any other logic may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The system may be distributed among multiple components, such as among multiple processors and memories, optionally including multiple distributed processing systems. Logic, such as programs or circuitry, may be combined or split among multiple programs, distributed across several memories and processors, and may be implemented in or as a function library, such as a dynamic link library (DLL) or other shared library.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system for sharing a user interface surface that is accessible simultaneously by multiple users through multiple respective sources, the system comprising:
    a processor;
    a memory coupled to the processor, the memory comprising:
        shared surface logic that:
            generates local canvases that are separate and distinct responsive to user interactions, including a first local canvas, a second local canvas, and a third local canvas, wherein the local canvases each comprise local canvas boundaries and a local canvas identifier;
            generates a first group canvas corresponding to at least the first and third local canvases, the at least first and third local canvases establishing a first set of local canvases, wherein the first set of local canvases are respective local representations of the first group canvas and the first group canvas is a shared surface representation of the first set of local canvases; and
            generates a second group canvas corresponding to at least the second and third local canvases, the at least second and third local canvases establishing a second set of local canvases, wherein the second set of local canvases are respective local representations of the second group canvas and the second group canvas is a shared surface representation of the second set of local canvases; and interaction detection logic that:
        detects multiple user interactions corresponding to the local canvases, wherein at least one of the detected multiple user interactions corresponds to an update to an object included in the third local canvas;
        based on detection of the update to the object included in the third local canvas, updates the object in the first group canvas and the object in the second group canvas to obtain an updated first group canvas and an updated second group canvas, respectively;
        updates the object in the first set of local canvases based on the updated first group canvas; and
        updates the object in the second set of local canvases based on the updated second group canvas.

2. The system of claim 1, wherein:
    the interaction detection logic detects whether at least two of the multiple user interactions are from one of the local canvases and two different users of the multiple users,
    the local canvases each further comprise user interaction modes, and the user interaction modes are from a group consisting of:
        a gadget mode that provides an awareness function that indicates the mode of each of the local canvases of a respective group canvas;
        a local annotation mode that updates a local canvas with an updated local representation in response to at least one of the multiple user interactions with the local canvas, without updating a group canvas to which the local canvas corresponds;
        a group annotation mode that updates the local canvases corresponding to a group canvas in response to at least one of the multiple user interactions with at least one of the local canvases corresponding to the group canvas; and
        a passive mode which sets a local canvas to read-only.

3. The system of claim 1, wherein:
    the interaction detection logic further detects the local canvas shared surface object representation using a shared surface object identifier;
    the shared surface object includes a shared surface object data type from a group of data types consisting of:
        audio;
        image;
        text;
        blob; and
        composite comprising a combination of any two or more of the data types from the group of data types;
    the multiple user interactions each comprise a local manipulation of a local canvas shared surface object representation; and
    a portion of the local canvas shared surface object representation is within the local canvas boundaries of the local canvases.

4. The system of claim 3, further comprising:
    graphical displays, each comprising a graphical display area identified by a graphical display area identifier,
    wherein the local canvases each correspond to a graphical display area, and
    wherein each graphical display area displays the respective local representation of the corresponding local canvases.

5. The system of claim 4, wherein the memory further comprises:
    service provider logic that:
        analyzes shared surface object metadata for the shared surface object, the shared surface object metadata including:
            the shared surface object identifier;
            a local canvas shared surface object version;
            display properties;
            the local canvas identifiers of the local canvases within which a portion of the local canvas shared surface object representation is within the respective local canvas boundaries of; and
            the group canvas identifiers to which the local canvases correspond; and
            the shared surface object data type;
        communicates the shared surface object metadata and the local manipulations of the local canvas shared surface object representation to service providers responsive to the shared surface object data type; and
        receives from the service providers updates of the local canvas shared surface object representations for each of the local canvases corresponding to the multiple user interactions, respectively.

6. The system of claim 5, wherein the interaction detection logic:
    generates a group canvas shared surface object record, comprising a group canvas shared surface object representation based on the shared surface object metadata and the updates of the local canvas shared surface object representations received from the service provides; and
    stores the group canvas shared surface object record in a shared surface object repository.

7. The system of claim 6, wherein the interaction detection logic:
   updates each of the local canvases with the respective update of the local canvas shared surface object representation received from the service providers;
   retrieves the shared surface object record from the shared surface object repository, using the shared surface object identifier; and
   updates the local canvas shared surface object representation with the group canvas shared surface object representation for each of the corresponding local canvases.

8. The system of claim 7, wherein the interaction detection logic:
   detects when a portion of the local canvas shared surface object representation is within the local canvas boundaries of the third local canvas; and
   updates the shared surface object metadata of the shared surface object to include the third group canvas identifier.

9. The system of claim 7, wherein the interaction detection logic detects whether the multiple user interactions are from local canvases corresponding to one of the group canvases in which a portion of the local canvas shared surface object representation is within the local canvas boundaries of.

10. The system of claim 7, wherein:
   the interaction detection logic monitors the local canvas shared surface object version; and
   the shared surface logic displays the local canvas shared surface object representation for each of the local canvases based on the local canvas shared surface object version.

11. The system of claim 10, wherein the shared surface logic modifies the display properties of the local canvas shared surface object representation based on the local canvas shared surface object version, including:
   the size;
   color;
   brightness;
   contrast; and
   position within the corresponding local canvases.

12. The system of claim 1, wherein the third local canvas is defined by at least a portion of the first and second local canvas boundaries common to the respective first and second local canvas boundaries.

13. The system of claim 1:
   wherein the shared surface logic generates a fourth local canvas of which at least two different portions of the fourth local canvas correspond to at least two different group canvases, the fourth local canvas being a user interface window defined by boundaries that specify a shape and size of the user interface window over a subset of a background displayed on a display screen; and
   wherein the interaction detection logic:
      detects a user interaction with the fourth local canvas;
      identifies a portion of the fourth local canvas corresponding to the user interaction with the fourth local canvas;
      determines, from among the at least two different group canvases, an impacted group canvas that corresponds to the identified portion of the fourth local canvas; and
      based on the determination of the impacted group canvas that corresponds to the identified portion of the fourth local canvas, updates the impacted group canvas that corresponds to the identified portion of the fourth local canvas without updating other of the at least two different group canvases.

14. The system of claim 1:
   wherein the shared surface logic:
      generates a third group canvas corresponding to a third set of local canvases; and
      generates a fourth group canvas corresponding to a fourth set of local canvases, the fourth set of local canvases being a subset of the third set of local canvases; and
   wherein the interaction detection logic:
      detects a first user interaction corresponding to one of the fourth set of local canvases;
      determines that the first user interaction corresponds to the third group canvas;
      updates the third group canvas in accordance with the first user interaction based on the determination that the first user interaction corresponds to the third group canvas;
      updates the third set of local canvases based on the updated third group canvas;
      detects a second user interaction corresponding to one of the fourth set of local canvases;
      determines that the second user interaction corresponds to the fourth group canvas;
      updates the fourth group canvas in accordance with the second user interaction based on the determination that the second user interaction corresponds to the fourth group canvas; and
      updates the fourth set of local canvases based on the updated fourth group canvas.

15. The system of claim 1:
   wherein the first local canvas is a first user interface window defined by first local canvas boundaries that specify a shape and size of the first user interface window over a subset of a first background displayed on a first display screen;
   wherein the second local canvas is a second user interface window defined by second local canvas boundaries that specify a shape and size of the second user interface window over a subset of a second background displayed on a second display screen; and
   wherein the third local canvas is a third user interface window defined by third local canvas boundaries that specify a shape and size of the second user interface window over a subset of a third background displayed on a third display screen.

16. The system of claim 1, wherein the first local canvas and the third local canvas are displayed on the same display screen.

17. A product for implementing a shared user interface surface that is accessible simultaneously by multiple users through multiple sources, the product comprising:
   a non-transitory machine-readable medium; and
   logic stored on the medium that:
      generates local canvases that are separate and distinct responsive to user interactions, including a first local canvas, a second local canvas, and a third local canvas, wherein the local canvases each comprise local canvas boundaries and a local canvas identifier, and wherein the local canvases each correspond to a graphical display area;
      generates a first group canvas corresponding to at least the first and third local canvases, the at least first and third local canvases establishing a first set of local canvases, wherein the first set of local canvases are respective local representations of the first group canvas and the first group canvas is a shared surface representation of the first set of local canvases;

generates a second group canvas corresponding to at least the second and third local canvases, the at least second and third local canvases establishing a second set of local canvases, wherein the second set of local canvases are respective local representations of the second group canvas and the second group canvas is a shared surface representation of the second set of local canvases;

communicates the local canvases to respective graphical display areas for displaying;

detects multiple user interactions corresponding to the local canvases, wherein at least one of the detected multiple user interactions corresponds to an update to an object included in the third local canvas;

based on detection of the update to the object included in the third local canvas, updates the object in the first group canvas and the object in the second group canvas to obtain an updated first group canvas and an updated second group canvas, respectively;

updates the object in the first set of local canvases based on the updated first group canvas; and updates the object in the second set of local canvases based on the updated second group canvas.

18. The product of claim 17, wherein:

the logic further detects whether at least two of the multiple user interactions are from one of the local canvases and two different users of the multiple users, and the local canvases each further comprise user interaction modes, the user interaction modes are from a group consisting of:
  a gadget mode that provides an awareness function that indicates the mode of each of the local canvases of a respective group canvas;
  a local annotation mode that updates a local canvas with an updated local representation in response to at least one of the multiple user interactions with the local canvas, without updating a group canvas to which the local canvas corresponds;
  a group annotation mode that updates the local canvases corresponding to a group canvas in response to at least one of the multiple user interactions with at least one of the local canvases corresponding to the group canvas; and
  a passive mode which sets a local canvas to read-only.

19. The product of claim 17, wherein:

the multiple user interactions each comprise a local manipulation of a local canvas shared surface object representation; and a portion of the local canvas shared surface object representation is within the local canvas boundaries of the local canvases.

20. The product of claim 19, wherein:

the logic further detects the local representations of the shared surface object using a shared surface object identifier, and the shared surface object is from a group of data types consisting of:
  audio;
  image;
  text;
  blob; and
  composite comprising a combination of any two or more of the data types from the group of data types.

21. The product of claim 20, wherein the logic:

analyzes shared surface object metadata for each shared surface object, the shared surface object metadata including:
  the shared surface object identifier;
  a local canvas shared surface object version that indicates the time of the last update of the local canvas shared surface object representation;
  display properties;
  the local canvas identifiers of the local canvases within which a portion of the local canvas shared surface object representation is within the local canvas boundaries of; and
  the group canvas identifiers to which the local canvases correspond; and
  the data type of the shared surface object;

communicates the shared surface object metadata and the local manipulations of the local representations of the shared surface object to service providers responsive to the data type of the shared surface object; and receives from the service providers an update of the local representations of the shared surface object for each of the local canvases corresponding to the multiple user interactions, respectively.

22. The product of claim 21, wherein the logic:

generates a shared surface object record comprising a group canvas shared surface object representation for each corresponding group canvas based on the shared surface object metadata and the updates of the local canvas shared surface object representation received from the service provides; and stores the shared surface object record in a shared surface object repository.

23. The product of claim 22, wherein the logic:

updates each of the local canvases with the respective update of the local canvas shared surface object representation received from the service providers;

retrieves the shared surface object record from the shared surface object repository, using the shared surface object identifier; and updates the local canvas shared surface object representation with the group canvas shared surface object representation for each of the corresponding local canvases.

24. The product of claim 23, wherein the logic:

detects when a portion of the local canvas shared surface object representation is within the local canvas boundaries of the third local canvas; and updates the shared surface object metadata of the shared surface object to include the third group canvas identifier.

25. The product of claim 23, wherein the logic detects whether the multiple user interactions are from local canvases corresponding to one of the group canvases in which a portion of the local canvas shared surface object representation is within the local canvas boundaries of the local canvases.

26. The product of claim 23, wherein the logic: monitors the local canvas shared surface object version; and displays the local canvas shared surface object representation for each of the local canvases based on the local canvas shared surface object version.

27. The product of claim 26, where the logic modifies the display properties of the local canvas shared surface object representation based on the local canvas shared surface object version, including:
  the size;
  color;
  brightness;
  contrast; and
  position within the corresponding local canvases.

28. A method for implementing a shared user interface surface that is accessible simultaneously by multiple users through multiple sources, the method comprising:
- generating local canvases that are separate and distinct responsive to user interactions, including a first local canvas, a second local canvas, and a third local canvas, for the multiple users, wherein the local canvases each comprise local canvas boundaries and a local canvas identifier corresponding to a graphical display area identifier;
- generating a first group canvas corresponding to at least the first and third local canvases, the at least first and third local canvases establishing a first set of local canvases, wherein the first set of local canvases are respective local representations of the first group canvas and the first group canvas is a shared surface representation of the first set of local canvases;
- generating a second group canvas corresponding to at least the second and third local canvases, the at least second and third local canvases establishing a second set of local canvases, wherein the second set of local canvases are respective local representations of the second group canvas and the second group canvas is a shared surface representation of the second set of local canvases;
- communicating the local canvases for the multiple users to graphical display areas for displaying, wherein the graphical display areas are each identified by the graphical display area identifier;
- detecting multiple user interactions corresponding to the local canvases, wherein at least one of the detected multiple user interactions corresponds to an update to an object included in the third local canvas;
- based on detection of the update to the object included in the third local canvas, updating the object in the first group canvas and the object in the second group canvas to obtain an updated first group canvas and an updated second group canvas, respectively;
- updating the object in the first set of local canvases based on the updated first group canvas; and
- updating the object in the second set of local canvases based on the updated second group canvas.

29. The method of claim 28, wherein detecting the multiple user interactions further comprises detecting a local manipulation of a local canvas shared surface object representation and a portion of the local canvas shared surface object representation within the local canvas boundaries of the local canvases.

30. The method of claim 29, wherein detecting further comprises detecting the shared surface object using a shared surface object identifier, wherein the shared surface objects is from a group of data types consisting of:
- audio;
- image;
- text;
- blob; and
- composite comprising a combination of any two or more of the data types from the group of data types.

31. The method of claim 30, further comprising:
- analyzing shared surface object metadata for each shared surface object, the shared surface object metadata including:
  - the shared surface object identifier;
  - a local canvas shared surface object version that indicates the time of the last update of the local canvas shared surface object representation;
  - display properties;
  - the local canvas identifiers of the respective local canvases within which a portion of the local canvas shared surface object representation is within the local canvas boundaries of; and
  - the group canvas identifiers to which the local canvases correspond; and
  - the shared surface object data type;
- communicating the shared surface object metadata and the local manipulations of the local canvas shared surface object representations to service providers responsive to the shared surface object data type;
- receiving from the service providers an update of the local canvas shared surface object representation for each of the local canvases corresponding to the multiple user interactions, respectively;
- generating a group canvas shared surface object record comprising a group canvas shared surface object representation based on the shared surface object metadata and the updates of the local canvas shared surface object representation received from the service provide;
- storing the group canvas shared surface object record in a shared surface object repository;
- updating each of the local canvases with the respective update of the local canvas shared surface object representation received from the service providers;
- retrieving the group canvas shared surface object record from the shared surface object repository, using the shared surface object identifier; and
- updating the local canvas shared surface object representation with the group representation for the local canvases corresponding to the respective group canvas.

* * * * *

UNITED STATES PATENT AND TRADEMARK OFFICE
CERTIFICATE OF CORRECTION

PATENT NO. : 8,489,999 B2
APPLICATION NO. : 12/203111
DATED : July 16, 2013
INVENTOR(S) : Brandon L. Harvey et al.

It is certified that error appears in the above-identified patent and that said Letters Patent is hereby corrected as shown below:

Title Page 2, column 1, line 6, under "OTHER PUBLICATIONS", delete "virtu" and insert -- virtual --, therefor.

Title Page 2, column 1, line 11, under "OTHER PUBLICATIONS", delete "GUIDE&d1" and insert -- GUIDE&dl --, therefor.

Title Page 2, column 2, line 1, under "OTHER PUBLICATIONS", delete "wor" and insert -- work --, therefor.

Title Page 2, column 2, line 2, under "OTHER PUBLICATIONS", delete "org/URL" and insert -- org/10.1145/240080.240319 ISBN: 0-89791-765-0 Retrieved from the Internet: URL --, therefor.

In the Claims

In claim 6, column 20, line 65, delete "provides;" and insert -- providers; --, therefor.

In claim 22, column 24, line 28, delete "provides;" and insert -- providers; --, therefor.

In claim 27, column 24, line 59, delete "where" and insert -- wherein --, therefor.

In claim 31, column 26, line 37, delete "provide;" and insert -- providers; --, therefor.

Signed and Sealed this
Twelfth Day of November, 2013

Teresa Stanek Rea
*Deputy Director of the United States Patent and Trademark Office*